US012786602B2

(12) United States Patent
Wang et al.

(10) Patent No.: US 12,786,602 B2
(45) Date of Patent: *Nov. 3, 2026

(54) PASSIVE OPTICAL NETWORK

(71) Applicant: ARRIS Enterprises LLC, Horsham, PA (US)

(72) Inventors: Peng Wang, Harleysville, PA (US); Shawn W. Warner, Pepperell, MA (US); Tarkesh R. Mahajan, Westford, MA (US)

(73) Assignee: ARRIS Enterprises LLC, Horsham, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/691,396

(22) PCT Filed: Aug. 24, 2023

(86) PCT No.: PCT/US2023/031089

§ 371 (c)(1), (2) Date: Mar. 12, 2024

(87) PCT Pub. No.: WO2024/054364

PCT Pub. Date: Mar. 14, 2024

(65) Prior Publication Data

US 2025/0142236 A1 May 1, 2025

Related U.S. Application Data

(60) Provisional application No. 63/462,452, filed on Apr. 27, 2023, provisional application No. 63/432,221, filed on Dec. 13, 2022, provisional application No. 63/428,352, filed on Nov. 28, 2022, provisional application No. 63/425,832, filed on Nov. 16, 2022, provisional application No. 63/415,224, filed on Oct. 11, 2022, provisional application No. 63/409,153, (Continued)

(51) Int. Cl.
*H04Q 11/00* (2006.01)
*H04B 10/27* (2013.01)

(52) U.S. Cl.
CPC ......... *H04Q 11/0067* (2013.01); *H04B 10/27* (2013.01); *H04Q 11/0005* (2013.01); *H04Q 2011/0083* (2013.01)

(58) Field of Classification Search
CPC . H04B 10/27; H04L 41/0806; H04L 41/0895; H04L 41/0897; H04L 41/122; H04L 41/145; H04L 41/40; H04Q 11/0005; H04Q 11/0067; H04Q 2011/0064; H04Q 2011/0083; H04Q 2011/0086
See application file for complete search history.

(56) References Cited

U.S. PATENT DOCUMENTS

2022/0231907 A1* 7/2022 Li ....................... H04L 41/0213

FOREIGN PATENT DOCUMENTS

EP 4024884 A1 7/2022

OTHER PUBLICATIONS

Polt Simulator (Year: 2020).*

(Continued)

*Primary Examiner* — David C Payne
*Assistant Examiner* — Mohammed Abdelraheem
(74) *Attorney, Agent, or Firm* — Chernoff, Vilhauer, McClung & Stenzel, LLP

(57) ABSTRACT

A system for a passive optical network.

5 Claims, 41 Drawing Sheets

Related U.S. Application Data filed on Sep. 22, 2022, provisional application No. 63/403,995, filed on Sep. 6, 2022.

(56) References Cited

OTHER PUBLICATIONS

TR-484 (Year: 2022).*
TR-451 (Year: 2022).*
TR-385 (Year: 2020).*
OB-BAA (Year: 2018).*
Juniper (Year: 2022).*
International Search Report and Written Opinion RE: Application No. PCT/US2023/031089, dated Jan. 24, 2024.
Carey Tim et al: "TR-451 vOMCI Specification", Jun. 1, 2022, pp. 1-113, XP093005109, Retrieved from the Internet: URL: https://www.broadband-forum.org/technical/download/TR-451.pdf [retrieved on Dec. 5, 2022] the whole document.

* cited by examiner

| Status Database | |
|---|---|
| ONT | Time Stamps |
| A2 | 11/15/2022 10:45 PM |
| A7 | 11/17/2022 11:02 AM |
| A10 | 11/18/2022 12:01 PM |
| B13 | 11/10/2022 10:02 AM |
| B19 | 11/1/2022 11:04 PM |

| Status Database | | | | | |
|---|---|---|---|---|---|
| ONT | Date 1 | Date 2 | Date 3 | Date 4 | Date 5 |
| A2 | ✓ | ✓ | ✓ | ✓ | |
| A7 | ✓ | ✓ | ✓ | | |
| A10 | ✓ | ✓ | ✓ | | |
| B13 | ✓ | | ✓ | ✓ | |
| B19 | | ✓ | | | |

| | Remote-OLT/ OLT | Diagnostic | ONT A | Diagnostic | ONT B | Diagnostic |
|---|---|---|---|---|---|---|
| Transmission Power Level | 2 db | Good | 1 db | Good | -12 db | Alarm |
| Receiving Power Level | 0 db | Good | 2 db | Good | -4 db | Warning |

*FIG. 36*

| OLT | Error | ONT |
|---|---|---|
| Remove OLT/OLT | 2 BER DS 2 BER US | ONT A |
| | 3 BER DS 4 BER US | ONT B |
| | 17 BER DS 17 BER US | ONT C |
| | 18 BER DS 18 BER US | ONT D |

| Remove OLT/OLT | Laser Diode/BER |
|---|---|
| | Good |
| ONT A | Poor |
| ONT B | Good |
| ONT C | Good |

| | Temperature | Status |
|---|---|---|
| Remote - OLT/OLT | 48° F | Good |
| ONT A | 69° F | Good |
| ONT B | 75° F | Good |
| ONT C | 135° F | High |

*FIG. 39*

| Remote - OLT/OLT | Supply Voltages | Status |
|---|---|---|
| | 24 v Rad<br>15 v FPGA | Good<br>Good |
| ONT A | 22 Volts | Good |
| ONT B | 23 Volts | Good |
| ONT C | 16 Volts | Fail |

*FIG. 40*

PASSIVE OPTICAL NETWORK

CROSS REFERENCE TO RELATED APPLICATIONS

This application is a 371 National Stage Patent application claiming priority to PCT International Patent Application No. PCT/US23/31089 filed Aug. 24, 2023, which claims the benefit of U.S. Patent Application Ser. No. 63/425,832 filed Nov. 16, 2022 entitled BRIDGING FOR A VIRTUALIZED PON NETWORK;

claims the benefit of U.S. Patent Application Ser. No. 63/409,153 filed Sep. 22, 2022 entitled VIRTUALIZED PROCESSING FOR PON NETWORKS;

claims the benefit of U.S. Patent Application Ser. No. 63/428,352 filed Nov. 28, 2022 entitled OPERATIONAL STATE OUTPUTS FOR OLTS;

claims the benefit of U.S. Patent Application Ser. No. 63/403,995 filed Sep. 6, 2022 entitled HYBRID DYNAMIC VIRTUAL OLT DEPLOYMENT;

claims the benefit of U.S. Patent Application Ser. No. 63/415,224 filed Oct. 11, 2022 entitled THERMAL MANAGEMENT SYSTEM FOR OLTS;

claims the benefit of U.S. Patent Application Ser. No. 63/432,221 filed Dec. 13, 2022 entitled ANALYTICS FOR A MIXED PASSIVE OPTICAL NETWORK; and claims the benefit of U.S. Patent Application Ser. No. 63/462,452 filed Apr. 27, 2023 entitled DEVICE MANAGEMENT USING NETCONF CALL HOME.

BACKGROUND

The subject matter of this application relates to passive optical networks.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibres and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data from the ONTs to the OLT are time divisional multiplexed.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which:

FIG. 36 illustrates power level management.

FIG. 39 illustrates temperature sensor management.

FIG. 40 illustrates supply voltage management.

DETAILED DESCRIPTION

Figure 1:
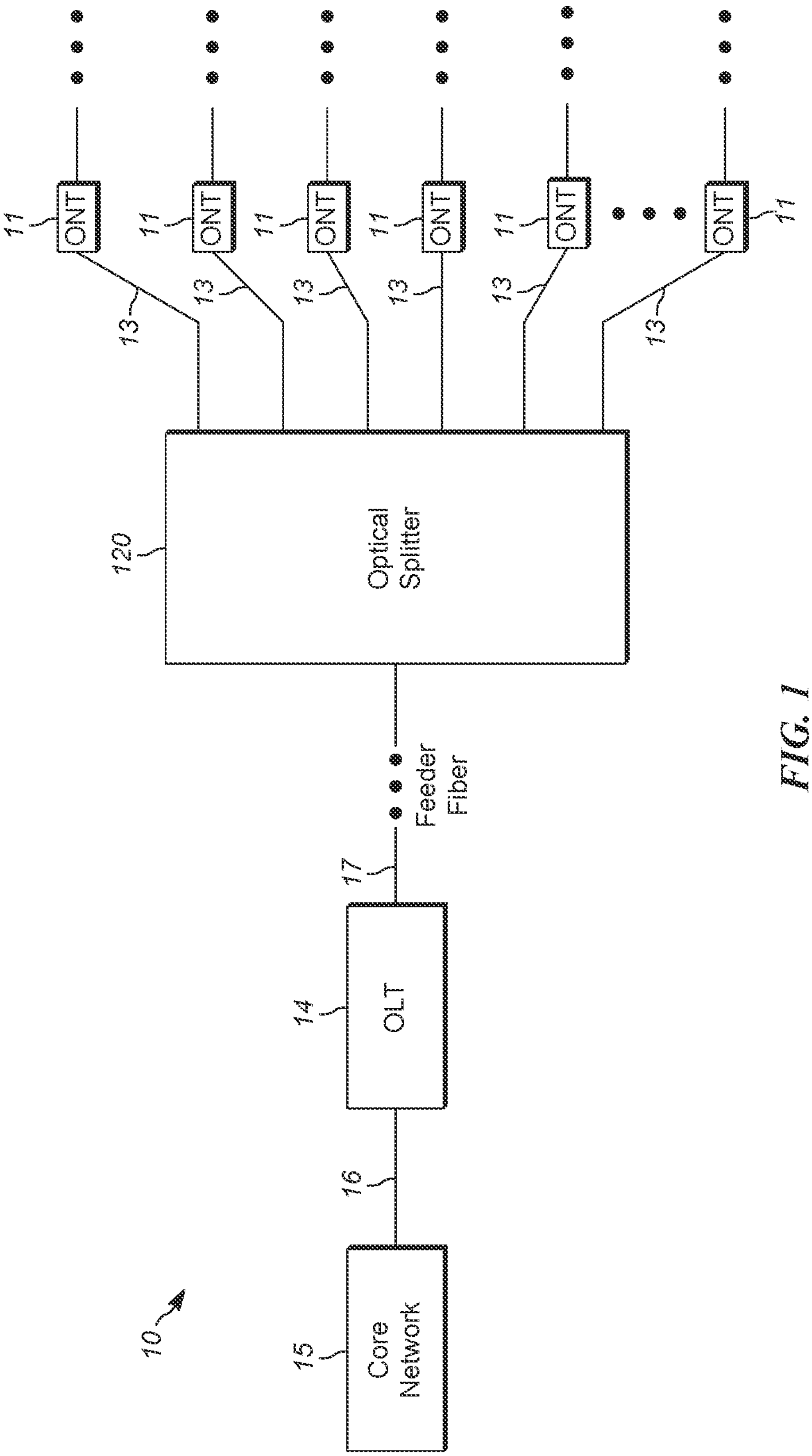
FIG. 1 illustrates a network that includes a passive optical network.
Figure 2:
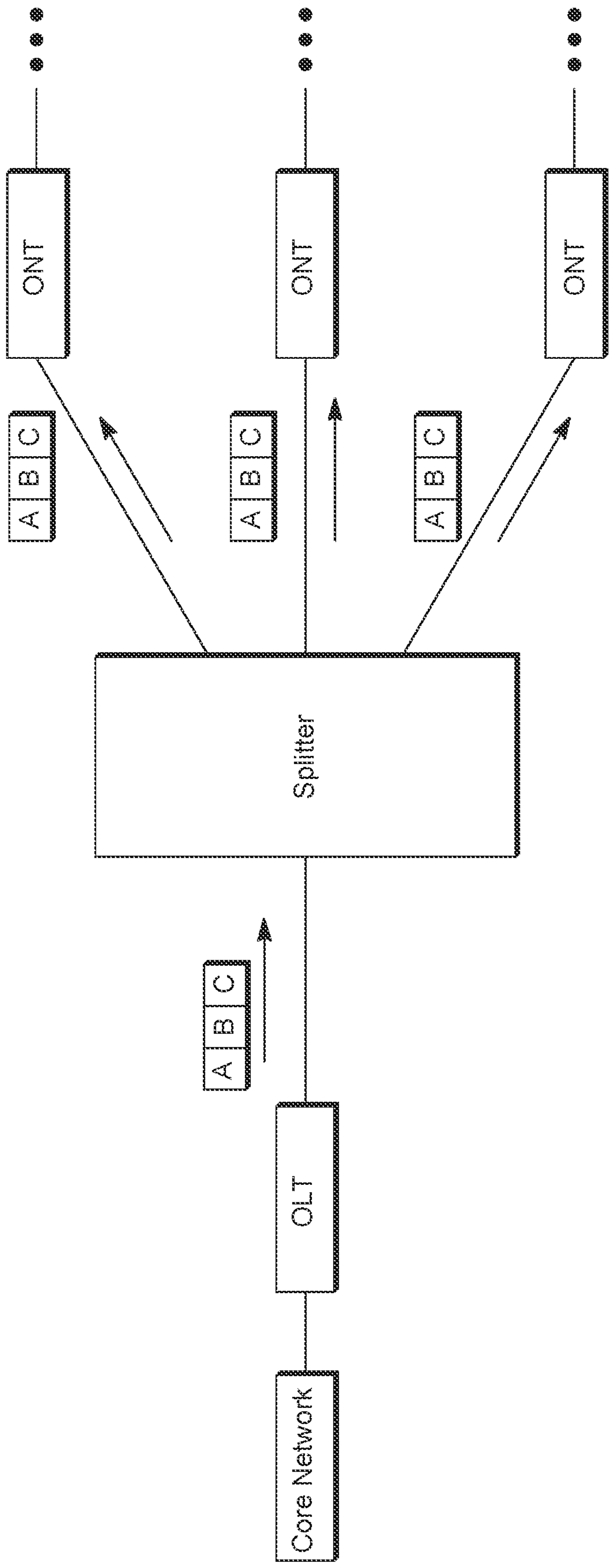
FIG. 2 illustrates a passive optical network with downstream data traffic.

Referring to FIG. 2, the PON network is based upon a point to multi-point downstream transmission arrangement. The data from the OLT is transmitted to all of the ONTs that are interconnected thereto. The data from the OLT is transmitted in the form of one or more frames, where each frame includes data for one or more of the ONTs. For example, in GPON a constant of 125 μs frame is used, where each frame includes (among other control information) an allocation map which informs on the slots granted to allocation ids. Accordingly, each frame is broken up into one or more timeslots that are designated for a corresponding selected one of the ONTs. The allocation map is piggybacked on the downstream traffic but is used by the upstream TDMA. Downstream multiplexing is based on GEM-port-ID.

Figure 3:
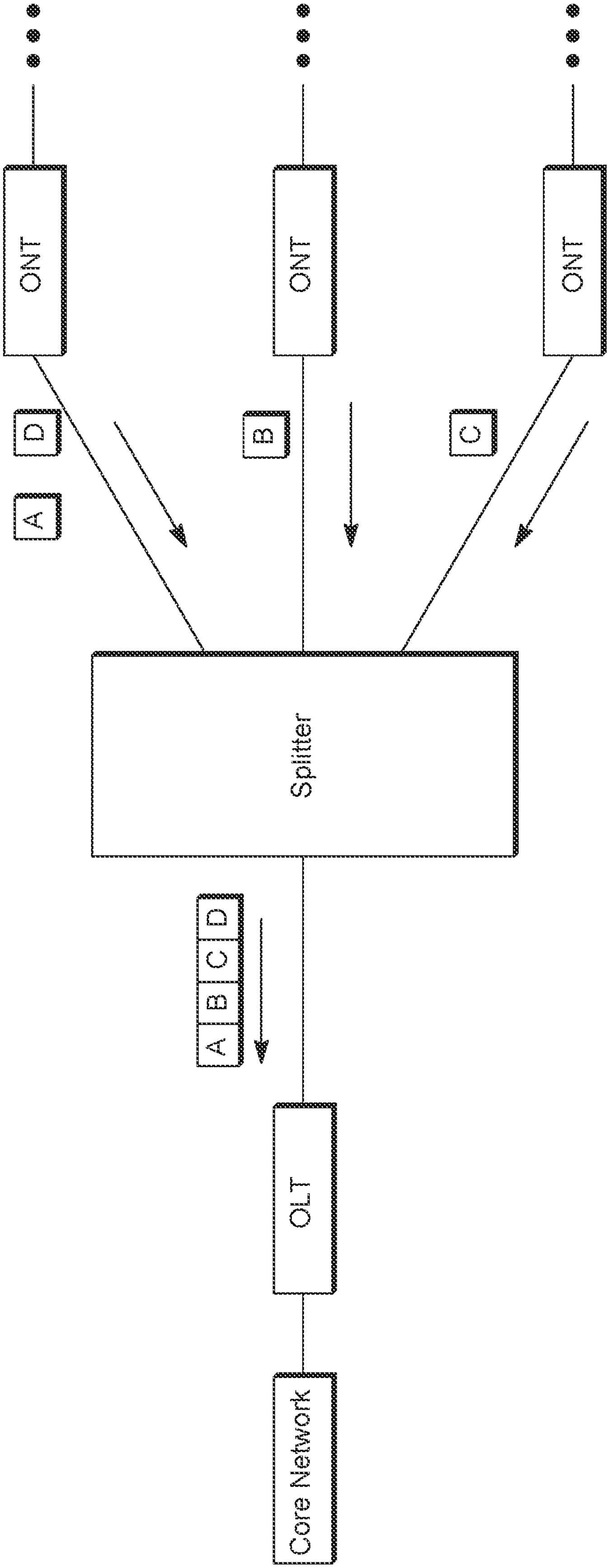
FIG. 3 illustrates a passive optical network with upstream data traffic.

Referring to FIG. 3, the PON network is based upon a multi-point to point upstream transmission arrangement using a time divisional multiple access mechanism. The OLT assigns timeslots (BWmaps) for each ONT to transmit its upstream transmission to ensure a collision free transmission. The data from each of the ONTs is transmitted to the corresponding OLT that it is interconnected thereto. The data from the ONT is transmitted in the form of a portion of one or more frames, where each frame includes data for one or more of the ONTs. For example, in GPON a reference frame of 125 μs frame is used, which is not an absolute value since a round of allocations may span through multiple upstream frames. GPON uses a Generic Encapsulation Method (GEM), which allows for the transport, segmentation and reassembly of Ethernet frames and legacy traffic (ATM or TDM). Accordingly, each frame is broken up into one or more timeslots that are designated for a corresponding selected one of the ONTs.

Figure 4:
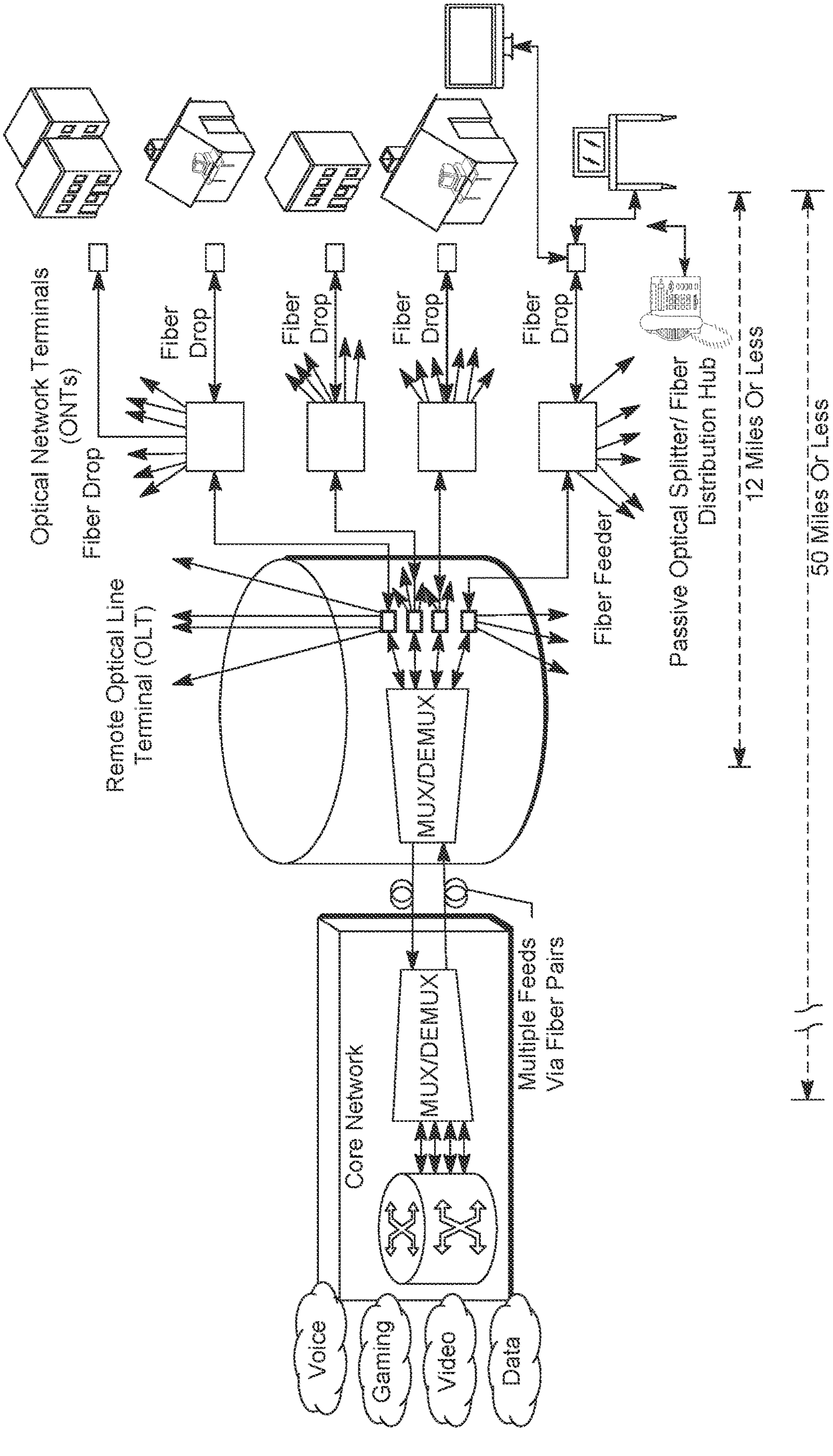
FIG. 4 illustrates a remote OLT.

Referring to FIG. 4, it is often desirable in some installations to locate the optical line terminal at a location remote from the core network, generally referred to as a remote optical line terminal (OLT). The remote OLT may include one or more feeds from the core network to the remote OLT. The remote OLT may then distribute data to a plurality of ONTs and receive data from the plurality of ONTs. Each of the ONTs in turn provides data to and receives data from customer devices. The remote OLT typically has the capability of providing services to a few hundred to a few thousand ONTs.

Figure 5:
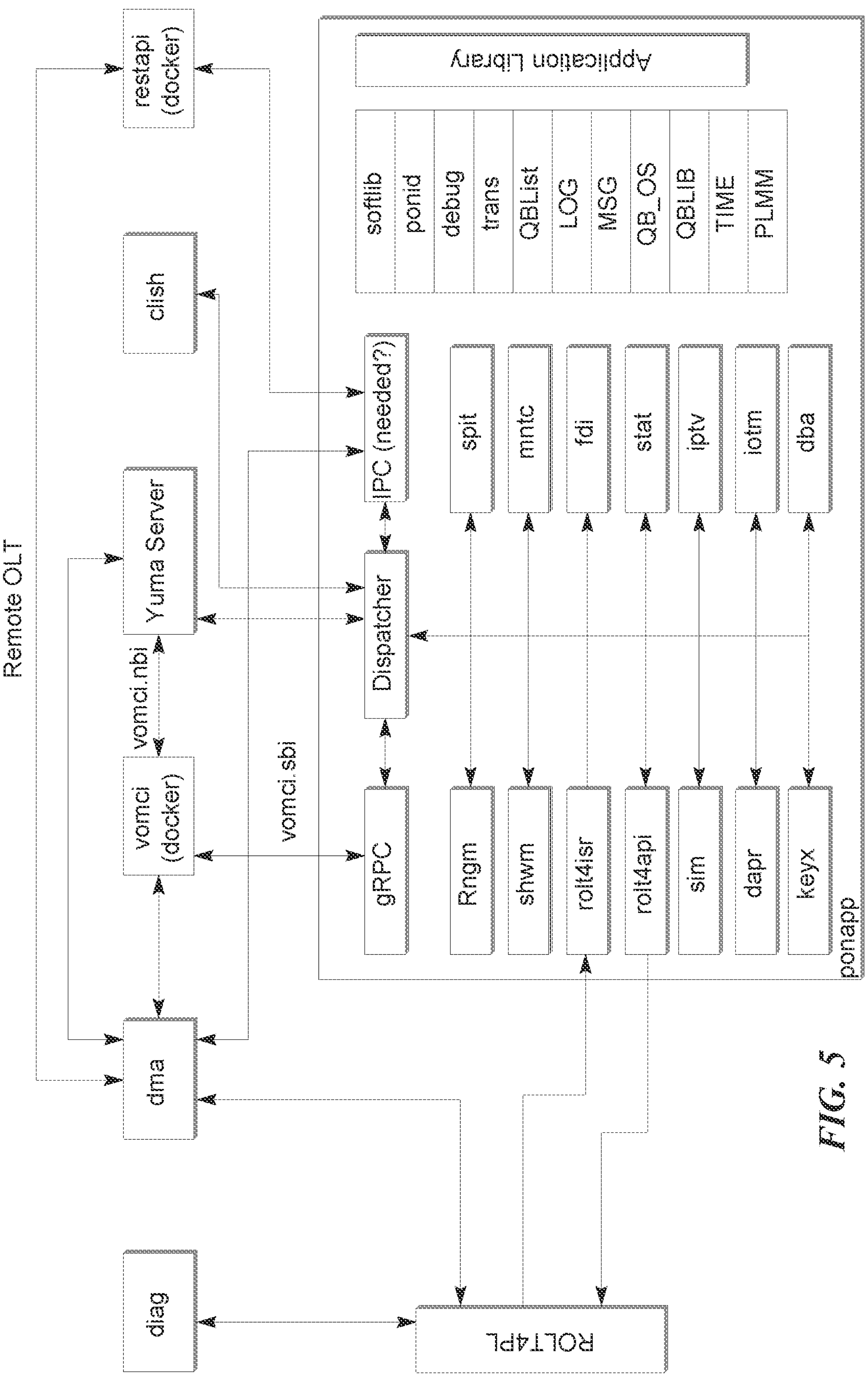
FIG. 5 illustrates an exemplary OLT.

Referring to FIG. 5, an exemplary OLT, which may include a local or a remote OLT, is illustrated. By way of example, a diag process, a dma process, a clish process, a restapi process, a gRPC process, a rolt4isr process, and/or a rolt4api process are preferably included locally on the OLT. Also, a dynamic bandwidth allocation process which allocates available bandwidth among to each of the ONTs is likewise included locally on the OLT. Other processes associated with the remote OLT, such as the vomci and/or Yuma server may be virtualized and located on a cloud based server. For example, the VOMCI may (1) receive service configurations from a virtual OLT management function, (2) translate the received configurations into ITU G.988 OMCI management entities and formatting them into OMCI messages, (3) encapsulating and sending formatted OMCI messages to and from a VOMCI proxy, (4) translating the OMCI messages (presenting ONT's operational data) received from the vOMCI proxy into data (e.g., notifications acknowledges, alarms, PM registers) understandable by the vOLT management function, and/or (5) sending the above ONT operational data to the vOLT management function. Sec, TR-451 vOMCI Specification, June 2022 and ONT management and control interface (OMCI) specification, G.988, November 2017, both of which are incorporated by reference herein in their entirety. See, TR-385 ITU-T PON YANG Modules, October 2020, incorporated by reference herein in its entirety. Sec, TR-383 Common YANG Modules for Access Networks, March 2022, incorporated by reference herein in its entirety.

By way of example, the gRPC provides gRPC server and client layer to interface with multiple vomci agents which may be providing vomci services to the ROLT.

By way of example, the dispatcher provides a messaging pathway between components within the ponapp. Local microservices may register callbacks for message ids which is part of the MSG layer. Any microservice can route to another based on the top 2 bytes of a message id that indicates the destination.

By way of example, the IPC provides TCP and UDP sockets for relaying messages to and from the application in the MSG lib format, and works side by side with the dispatcher.

By way of example, the mgm is a ranging manager that provides the state machine and local for the physical layer management of the ONT. This includes an auto discovery process, the ranging of an ONT, drift management, and LOS handling.

By way of example, the shwm is a shelf manager task that handles any devices that are outside of the rolt4api/rolt4isr domain.

By way of example, the rolt4isr is a handler for incoming interrupts from the PL.

By way of example, the rolt4api handles requests from various microservices in the ponapp to program or interact with the ROLT.

By way of example, the sim provides simulations services to provide the ability to simulate devices that may not be physically present.

By way of example, the spit is a smartcard proxy interface task that provides server for application requests coming in or out of the ponapp. A typical path would be from an outside client via IPC via dispatcher into the spit. The SPIT may then relay to other microservices to perform the requested task. Some provisioning may go via the softlib DB and will be further relayed as a provisioning callout.

By way of example, the mntc is a maintenance state machine which is preferably an event drive state machine for ONTs.

By way of example, the fdi is a fault detection and isolation task as a hierarchical alarm tree service to track alarm conditions for different equipment types.

By way of example, the stat is a statistics manager that handles polling of on board statistics and aggregation of statistics for other calling functions.

By way of example, the iptv provides IPTV services, including IGMP snooping/proxy support.

By way of example, the dapr is a destination address programmer that handles unknown upstream source mac addresses for N:1 connections. This may maintain the mac forwarding table in the PL as well as pruning out aged mac addresses.

By way of example, the iotm is an IoT (aka ONT) manager that suppors directives for the ONT.

By way of example, the dba is a dynamic bandwidth allocation.

By way of example, the keyx is a key exchange task that handles key exchanging for ONTs.

By way of example, the softlib is a soft DB library implemented as a memory based database used to contain configurations of the ROLT.

By way of example, the ponid is a library used to associate ITUT serial numbers with ONT ids and/or channel assignment.

By way of example, the debug is a debug library.

By way of example, the trans is a transaction library used for transactional and state based requests for microservices.

By way of example, the QBList is a library of various list and vector functions.

By way of example, the LOG is an event log.

By way of example, the MSG is a message library.

By way of example, the QB_OS is an operating system library.

By way of example, the QBLIB is a library for local APIs.

By way of example, the TIME is a timer library used for time based callback logic.

By way of example, the PLMM is a ploam message library used for the encoding and decoding of ploam messages on the pon.

The core network and/or the optical line terminals provides management and control functionality over the ONT by using an optical network unit management and control interface (OMCI). The core network 200 and the OLT 210 with which it provides data to and receives data from, transmits data and receives data using a PON protocol over an optical distribution network (e.g., optical splitters, etc.) 220 (see FIG. 2). The OLT 210 passes data through the optical distribution network (ODN) 220 to the ONTs 230, and receives data through the optical distribution network (ODN) 220 from the ONTs 230. The OMCI messages between the ONT 210 and the ONUs 230 for management and control are likewise provided between the OLT 210 and the ONTs 230 through the ODN 22. The ONTs 230 provides access network line termination, a user network interface line termination for subscriber devices, and service multiplexing and de-multiplexing for subscriber devices.

The configuration management provides functions to identify the ONTs capabilities and to exercise control over the ONTs. The areas of management for the ONTs include configuration of, (1) equipment, (2) passive optical network and reach extender protection, (3) the user network interfaces, (4) Gigabit-capable passive optical network Encapsulation Method port network contention termination points; (5) interworking termination points; (6) operations, administration, and maintenance flows, (7) physical ports, (8) Gigabit-capable passive optical network Encapsulation Method adaptation layer profiles, (9) service profiles, (10) traffic descriptors, and (11) asynchronous transfer mode adaptation layer profiles. As modelled by the OMCI, the ONT detects and reports equipment, software, and interface failures and declares the corresponding alarms. The ONTs may be considered as managed entities by the exchange of information between the OLT and the ONT, based upon the OMCI messages for optical access networks.

Figure 6:
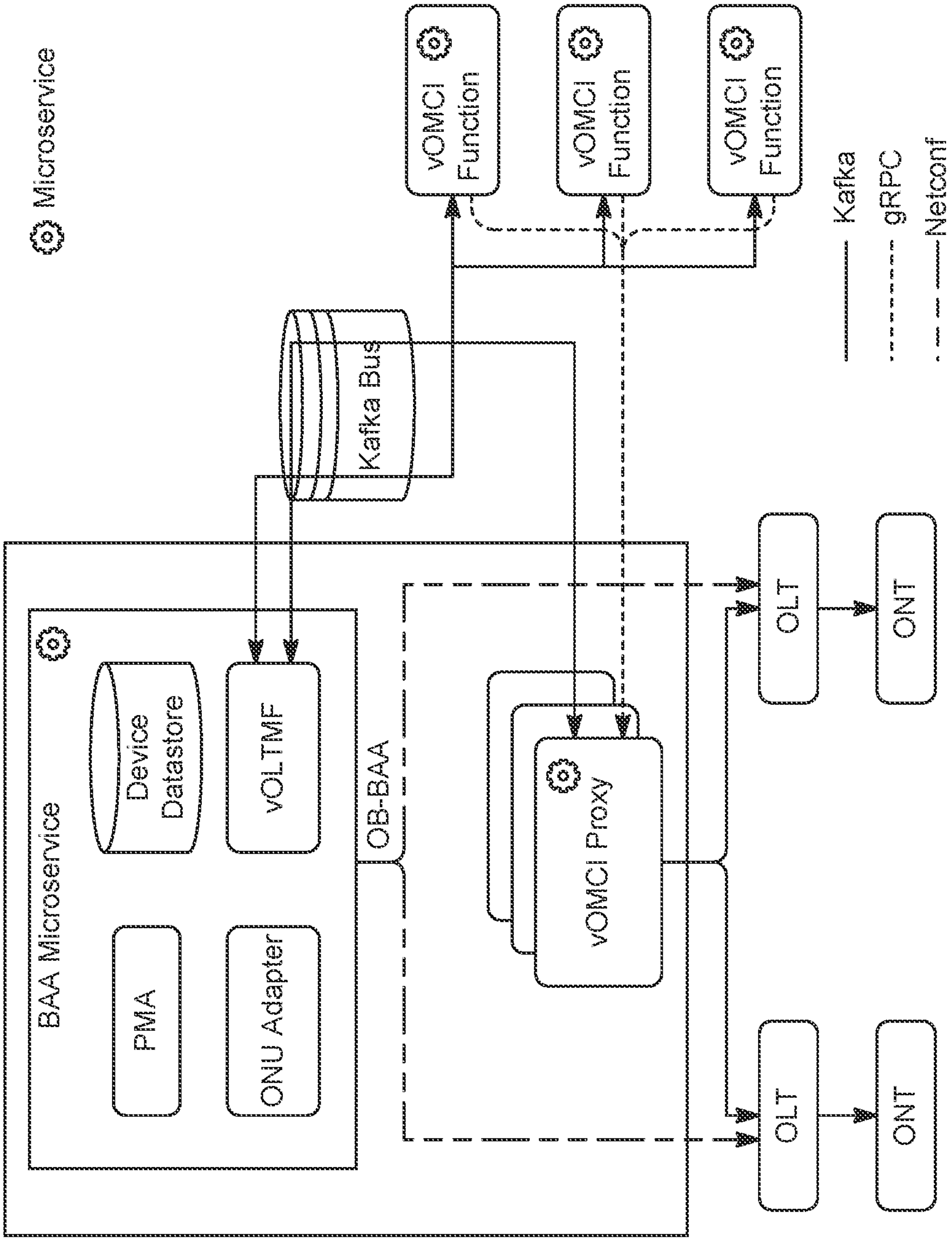
FIG. 6 illustrates a vOLT and OLT.

Referring to FIG. 6, a high-level design of a vOLT Management Function (vOLTMF) that may be used to manage ONTs through vOMCI messages is illustrated. There is communication between the vOLTMF, vOMCI Proxy, and vOMCI function based upon creating and deleting ONTs, receiving ont-state-change notifications, and sending requests to ONTs. The vOLTMF manages ONTs through a ONT adapter that may be deployed as broadband access abstraction, the association of which is based on the model, type, vendor, and version mentioned while creating the ONT. The ONT adapter may use a library of the YANG modules for ONTs that the vOLTMF refers to for handling ONT requests, responses, and notifications from external management systems.

The vOLTMF performs actions upon receiving notifications and requests either from an OLT device or other components within the broadband access abstraction core. For example, the onu-state-change notification that is sent by the OLT device on its Northbound Interface (NBI) that is received by broadband access abstraction core. The broadband access abstraction core propagates the notification towards vOLTMF and broadband access abstraction NBI so that it can be handled by the Access SDN M&C.

Upon reception of the notification, the vOLTMF processes the notification, checks if a preconfigured ONU device exists and authenticates the ONU, the vOLTMF transforms the notification to Google Protobufs (GPB) format and propagates the set-onu-communication Action towards the vOMCI function and vOMCI-proxy via the Kafka bus.

All the YANG requests are sent towards the vOMCI function and vOMCI Proxy via the Kafka bus in GPB format. Once the vOMCI function/Proxy processes the requests, the vOMCI function sends the notification/request response in GPB format back to the vOLTMF via the Kafka bus and the response is received through the KafkaNotificationCallback#onNotification( ).

Upon receiving the response, the vOLTMF is responsible for processing the response and performs actions accordingly.

There could be multiple interactions between the vOLTMF and the vOMCI function including parallel configuration requests/commands for either the same or different ONUs. These interactions are parallel and asynchronous such that the requests are not idle/blocked while waiting for responses because the vOLTMF has separate task queues and threadpools to handle the request/response interactions. The following shows the list of vOLTMF threadpools that spawned as new Runnable tasks, namely, processNotificationRequestPool, kafkaCommunicationPool, kafkaPollingPool, processNotificationResponsePool, and processRequestResponsePool. processNotificationRequestPool is used for processing the mediated device event listener callbacks and device notification requests. kafkaCommunicationPool is used to proess individual GET/COPY-CONFIG/EDIT-CONFIG requests inside a MediatedDeviceNetconfSession spawned by preocessRequestResponsePool. kafkaPollingPool is used to tart up the KafkaConsumer implementation and polling for responses from vOMCI-function/vOMCI Proxy. processRequestResponsePool is used for processing notification responses from the vOMCI-function/vOMCI Proxy. The processRequestResponsePool is used for processing GET/COPY-CONFIG/EDIT-CONFIG requests and responses from the vOMCI-function/vOMCI Proxy. In general, the process may be considered a type of protocol adapter to one that operates on an ONT that also works with an OLT in a PON environment. As it may be observed, the manner in which the processing is performed is relatively complex, including Google Protobufs, remote procedure calls, and other complications that require a substantial amount of computational resources to process all the micro-services which are burdensome for the OLT.

As it may be observed the vOMCI is based upon a mode described in TR-385 ITU-T PON YANG Modules, October 2020, where the OLT and the ONTs are managed and configured independently. The vOMCI disaggregates the ITU-T G.988 OMCI functionality traditionally hosted in the OLT into a virtualized network function, namely the vOMCI function, hosted on a server. The vOMCI function is driven by create, read, update, and delete primitives defined from YANG models. By disaggregating the vOMCI function, the PON deployment and operations improve by decoupling the ONT management from the OLT. This is especially true when the service providers use ONTs and OLTs from different vendors. Also, service agility is increased such that new capabilities maybe introduced into the service provider's network at a faster rate than if the function remains within the OLT. Also the vOMCI service disaggregates from the vOLT the vOMCI service logic such as the association of ONTs and vOMCI function instances, ONT management chain setup, manipulation of load balance and scale in/out of the vOMCI function instances.

As a general matter, the vOMCI may be responsible for translating a data model-based input received via the vOLT management function to vOMCI function interface.

As a general matter, the vOMCI may be responsible for converting the received input into a corresponding set of one or more OMCI messages.

As a general matter, the vOMCI may be responsible for transmitting in sequence OCMI messages to the OLT where the target ONT is attached.

As a general matter, the vOMCI may be responsible that if an OMCI message error occurs then returning an error message to the vOLT for the vOLT to recover the ONT to a good state.

As a general matter, the vOMCI may be responsible for translating the OCMI messages (e.g., responses to requests, notification events) received from the ONT into data mode-based inputs to the vOLT.

In this manner, the translation of the data model to and from OMCI messages removes the need for the OLT and the vOLT to have knowledge of the ITU-T G.988 message formats for basic and extended management entities with the associated sequences needed to perform the OMCI operations. In addition, the vOMCI function decouples changes in the data models (e.g., updates, extensions) of the vOLT from the OMCI messages supported by the ONT.

Figure 7:
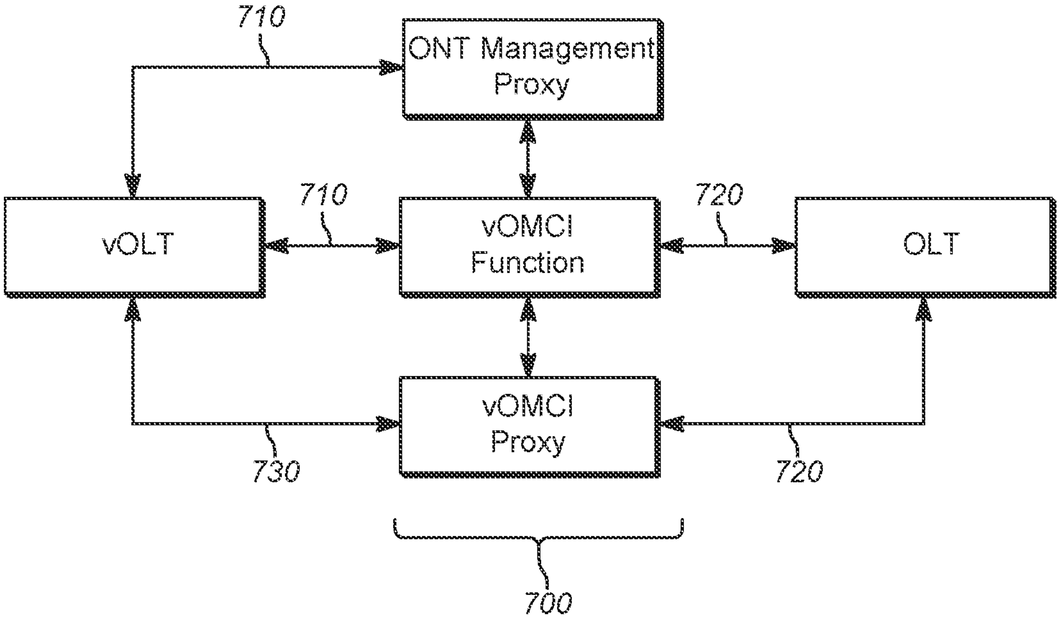
FIG. 7 illustrates vOMCI function and vOMCI proxy interfaces.

Referring to FIG. 7, by way of example, exemplary vOMCI function and vOMCI proxy interfaces are illustrated. The vOMCI 700 includes vOLT to vOMCI/ONT management proxy interface 710. The vOMCI 700 includes a vOMCI function to OLT interface 720. The vOMCI includes a vOLT to vOMCI proxy interface 730.

Figure 8:
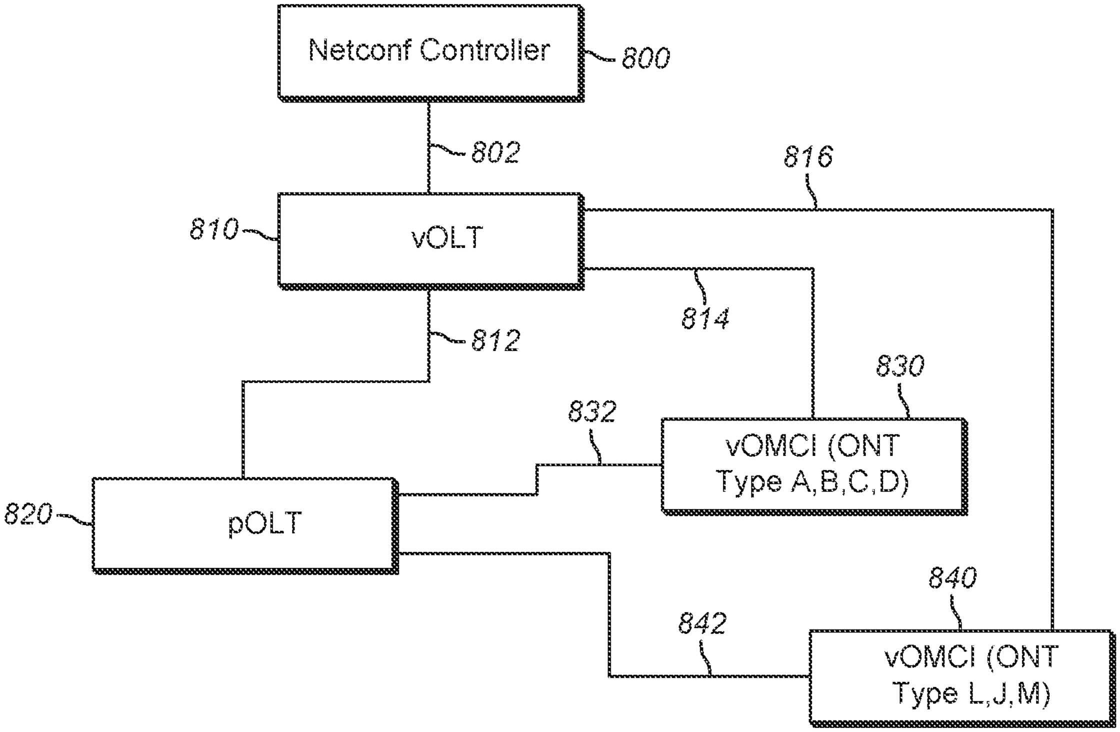
FIG. 8 illustrates a network including a vOLT, a vOMCI, and a pOLT.

Referring to FIG. 8, by way of example a system configuration may include a Netconf Controller 800 which provides a mechanism to install, manipulate, and delete the configuration of network devices. Netconf operations are normally realized on top of a Remote Procedure Call (RPC) layer using an XML encoding and provide a set of operations to edit and query configuration on a network device. The Netconf controller includes TR-385 compliant and TR-451 compliant Yang based communications 802 with a vOLT 810. The vOLT 810 includes TR-385 compliant Yang based communications 812 to the north bound interface of a POLT (physical OLT) 820. The vOLT 810 includes TR-451 complaint Yang based communications 814 with a north bound interface of a vOMCI 830 configured to supports ONT types A, B, C, and D (by way of example). The vOLT 810 includes TR-451 complaint Yang based communications 816 with a north bound interface of a vOMCI 840 configured to supports ONT types L, J, and M (by way of example). It is noted that the system may include one or more vOMCIs, some of which may support different types of ONTs. The vOMCI 830 includes TR-451 OMCI transport protocol-based communications 832 using its south bound interface to the pOLT 820. The vOMCI 840 includes TR-451 OMCI transport protocol-based communications 842 using its south bound interface to the pOLT 820.

One of the purposes of the vOLT is to manage the OLT for each ONT as separate Yang instance trees which permits aggregation of devices that are disaggregated based upon the Yang model. In this manner, the system is suitable for interconnecting between various vOMCI stacks and various pOLTS so that one can readily interchange devices from different manufacturers that internally operate somewhat differently.

In some situations, it may be desirable to integrate the vOMCI within the pOLT, and use traditional management systems to manage the pOLT with the integrated vOMCI. This is especially the case when the service provider does not want to support a server based vOLT within their networking environment. In this case, the system would not include the vOLT 810. With the absence of the vOLT 810, the communication between the vOLT and the vOMCI no longer is in conformance with the TR-451 standard because the vOLT is no longer used. Accordingly, the vOMCI then would provide all communications directly to the pOLT. However, the vOMCI that is designed to be compliant with the TR-451 is not suitable for managing all the communication with the pOLT.

After further consideration, the pOLT may often include a Yang based database that resides on the pOLT, such as Sysrepo Yang-based configuration and operational state data store. To communicate with the Yang based database, callbacks and APIs may be used, which should be performed by software operating on the pOLT, rather than a remote server.

Figure 9:
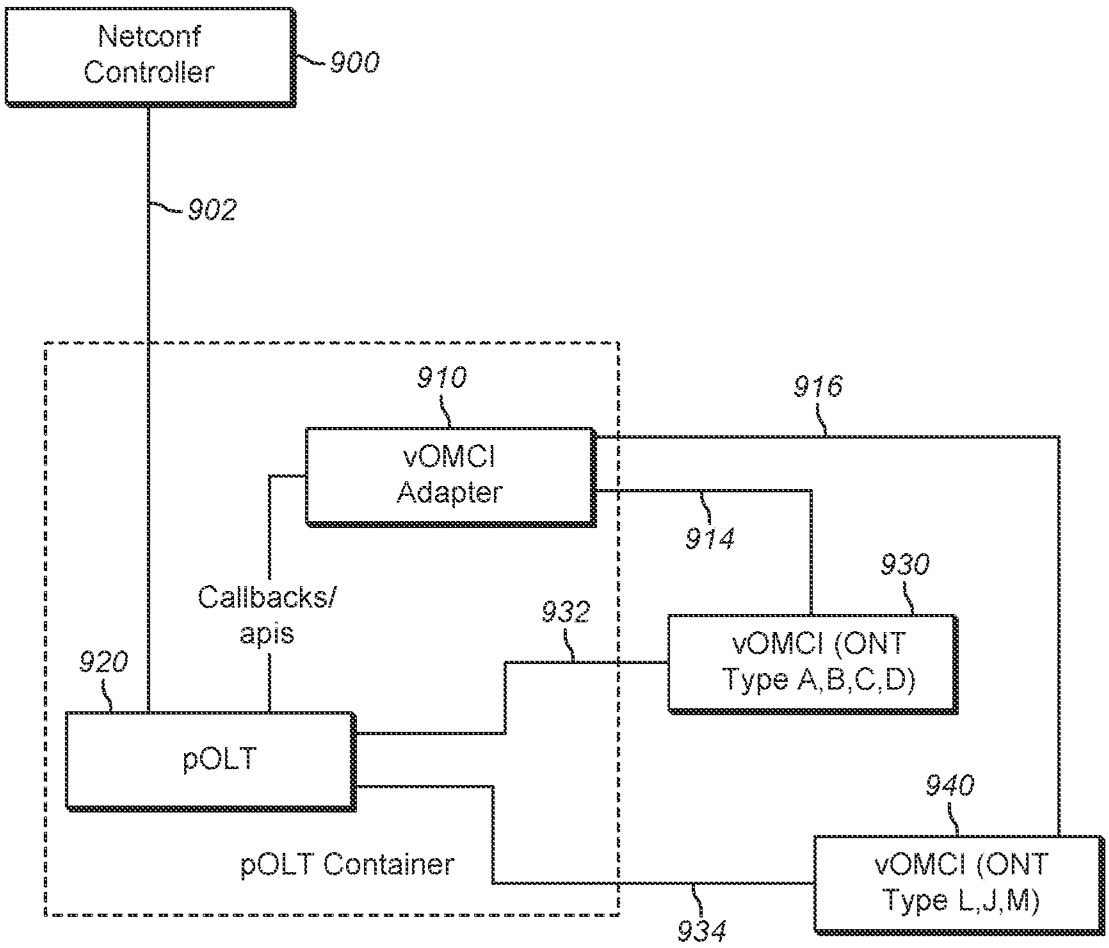
FIG. 9 illustrates a network including a vOMCI and a pOLT.

Referring to FIG. 9, by way of example a system configuration may include a Netconf Controller 900 which provides a mechanism to install, manipulate, and delete the configuration of network devices. Netconf operations are normally realized on top of a Remote Procedure Call (RPC) layer using an XML encoding and provide a set of operations to edit and query configuration on a network device. The Netconf controller includes TR-385 compliant Yang based communications 902 to a north bound interface of a pOLT (physical OLT) 920. A vOMCI 930 is configured to supports ONT types A, B, C, and D (by way of example). A vOMCI adapter 910, residing on the pOLT 920, includes TR-451 complaint Yang based communications 914 with a north bound interface of the vOMCI 930. A vOMCI 940 is configured to supports ONT types L, J, and M (by way of example). The vOMCI adapter 910, residing on the pOLT 920, includes TR-451 complaint Yang based communications 916 with a north bound interface of the vOMCI 940. It is noted that the system may include one or more vOMCIs, some of which may support different types of ONTs. The vOMCI 930 includes TR-451 OMCI transport protocol-based communications 932 using its south bound interface to the POLT 920. The vOMCI 940 includes TR-451 OMCI transport protocol-based communications 942 using its south bound interface to the pOLT 920. The vOMI adapter 910 sends and receives communications with the pOLT, such as using callbacks and APIs. The vOMCI adapter 910 also provide TR-451 compliant communications with the vOMCIs 930, 940. In this manner, the vOMCI adapter 910 modifies the communications from the pOLT to TR-451 complaint communications for the vOMCIs, and modifies the TR-451 complaint communications from the vOMCIs to communications for the pOLT. As it may be observed, the inclusion of the vOMCI adapter 910 enables the use of a TR-451 compliant vOMCI to be used in a system that includes a vOLT or in a system that does not include a vOLT, thereby increasing the flexibility of the TR-451 compliant vOMCI. The vOMCI may be included on the pOLT or included on a server separate from the OLT.

By way of example, the vOMCI adapter may be embedded within two or more architecturally heterogeneous components, which intercepts the communications between such components, rewrites the business logic of the communications API and redirects the communications traffic to these components so that they can accomplish intended functions. In virtualized computing environment, a functioning system often is comprised of many architecturally heterogeneous components. One example is components executing in distinct Linux OS kernel namespaces such as software containers. Each software container is executing in distinct set of Linux OS kernel network, cgroup, mnt, ipc, etc. namespaces. Another example is some components executing in distinct software containers, and some executing in Linux OS host environment. Communications among these heterogeneous components can be challenging due to their unique limitations of inter-container and container-to-host network namespaces bridging. Furthermore, applications executing in these components can have a wide range of distinct communication APIs. Examples of these are application specific callbacks, REST APIs, gRPC protobufs, sockets, etc. Supporting these distinct APIs among all applications is difficult, sometimes impossible, especially in cases when open source third party applications are involved. Another challenge is that as applications executing in these components evolve, the communication APIs and their business logics can change, making existing communications among these applications deprecated.

The vOMCI adapter is preferably embedded within two or more heterogeneous components in virtualized computing environment that the pOLT 920 and vOMCI 930 may be implemented. The vOMCI adapter identifies the communication APIs, intercepts API calls between these components, rewrites the business logic of the APIs based on prearranged or plug-n-play configurations, and redirects the communications traffic to these components so that they can accomplish intended functions. The applications executing in the components bridged by the vOMCI adapter can evolve independently without having to worry about adapting to each other's API changes. Furthermore, the API functionalities can be modified using plug-n-play configurations in the vOMCI adapter, making the system more flexible and easier to change behaviours. One vOMCI adapter implementation is in a PON (Passive Optical Network) virtualized OLT shelf system. In this system several applications run in distinct Docker containers and host namespaces. One of the applications is a layered NETCONF (Network Configuration Protocol) YANG (Yet Another Next Generation data modeling language) Processor that manages NETCONF traffic and YANG data store. The YANG data store contains provisioning data for the PON system. It uses subscription-callback API model to communicate state changes. Another application is a vOMCI (ONU Management and Control Interface) Manager that interacts with the NETCONF YANG Processor to obtain YANG state changes and use the provisioning data stored in YANG data store to provision and control ONU population. The Virtualized OMCI Manager opens a gRPC protobuf channel (or other protocol) as its API. The vOMCI adapter is added to facilitate the communications between the two distinct applications and APIs. The vOMCI adapter subscribes and intercepts the callbacks from NETCONF YANG Processor state changes, optionally rewrites the business logic of the callbacks based on pre-arranged or plug-n-play configurations, and redirects the communications traffic to the Virtualized OMCI Manager through the gRPC protobuf channel (or other protocol). APIs of the NETCONF YANG Processor and the Virtualized OMCI Manager can evolve independently with the help of the vOMCI adapter.

There is a selection between those components of the OLT that are included on the physical OLT that includes the optical components (e.g., laser and/or optical sensor) to send and receive signals to and from the optical fiber and the vOLT. There are timing considerations, especially with respect to signals received from the ONTs, that should be adhered to in providing responsive signals which are more preferably provided by the physical OLT rather than the vOLT. By way of example, in order to realize part of the management function of OLT to ONT, the G.984.3 standard definition of ITU-T physical layer operations management maintenance (Physical layer Operations, Administration and Maintenance, referred as PLOAM) passage, GPON utilizes PLOAM channel transfer PLOAM message, realizes the management to transmission convergence layer, comprise that ONU activates, the foundation of ONT management control channel, encryption configuration, key management etc. The PLOAM message is transmitted in uplink frame (ONT sends to the frame of OLT) and downlink frame (OLT sends to the frame of ONT), comprises a PLOAM message in each downlink frame, whether comprises PLOAM message in the OLT decision uplink frame. Defined descending PLOAM (the Physical layer Operations that OLT issue ONT among the GPON, Administration and Maintenance downstream, be called for short PLOAMd) message, ONU issues up PLOAM (the Physical layer Operations of OLT, Administration and Maintenance upstream is called for short PLOAMu) message. The PLOAM is preferably included with the physical OLT to reduce the latency included within such control paths. In addition to the PLOAM, the dynamic bandwidth allocation is preferably included within the physical OLT to reduce the latency.

Those aspects related to switch provisioning are more preferably included with the virtual OLT. In addition, YANG related processing is also preferably included with the virtual OLT. Also, control layer and provisioning of the ONTs is also preferably included with the virtual OLT.

Figure 10:
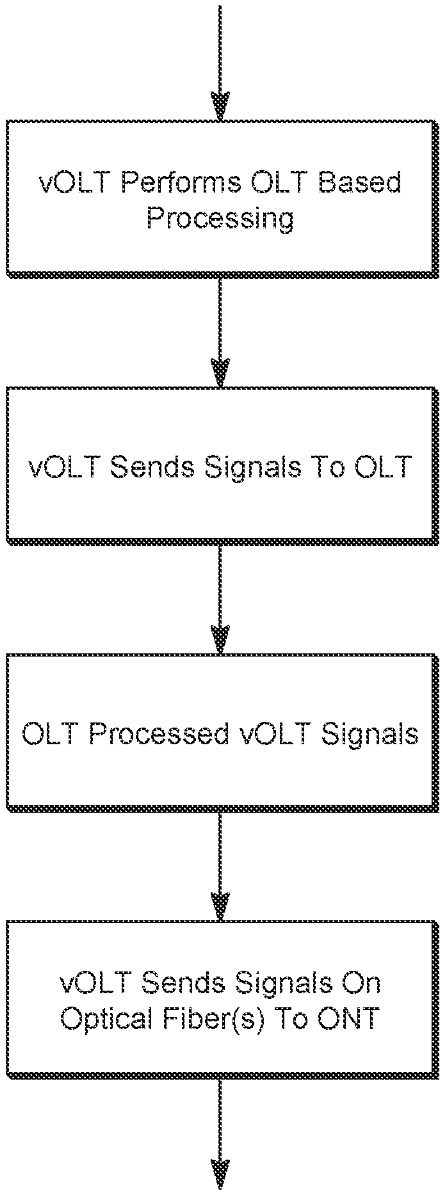
FIG. 10 illustrates a downstream data path for a vOLT and an OLT.

Referring to FIG. 10, the vOLT receives signals (e.g., data) from the core network and in response performs any processing on the data that is appropriate. The processed data, as appropriate is sent to the physical OLT which processes the vOLT data, as appropriate. The processed data from the vOLT is sent on an optical fiber(s) to the ONTs. In general, the vOLT and OLT operate in combination to perform the optical line terminal based processing for signals from the core network.

Figure 11:
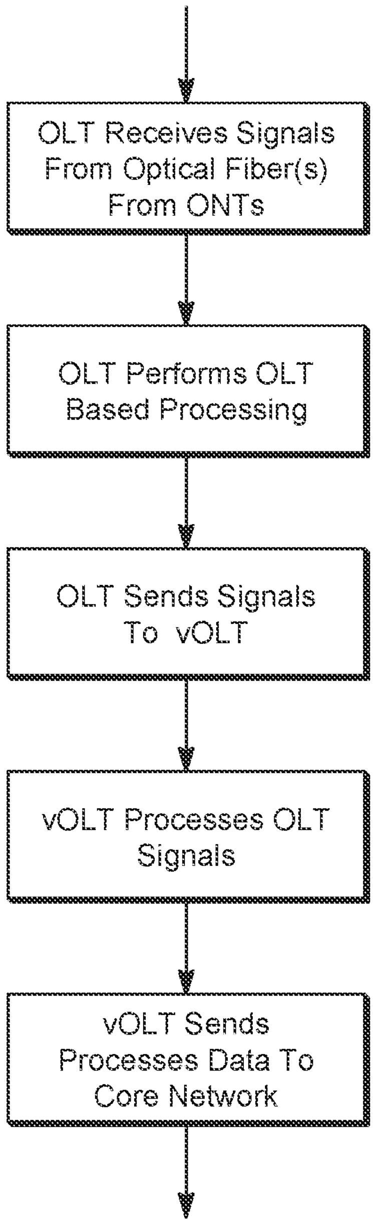
FIG. 11 illustrates an upstream data path for a vOLT and an OLT.

Referring to FIG. 11, the physical OLT receives signals (e.g., data) from the optical fiber(s) from the ONTs and in response performs any processing on the data that is appropriate. The processed data, as appropriate is sent to the vOLT which processes the OLT data, as appropriate. The processed data from the vOLT is sent to the core network. In general, the vOLT and OLT operate in combination to perform the optical line terminal based processing for signals from the ONTs.

It was determined that there is some likelihood that the vOLT may not perform properly or otherwise be undergoing an upgrade process that inhibits the ability for the vOLT to process and/or send data to the OLT, and for the vOLT to receive data from the OLT. In such a case, the ability of the ONTs to send and receive data from the core network is compromised or otherwise not available.

Figure 12:
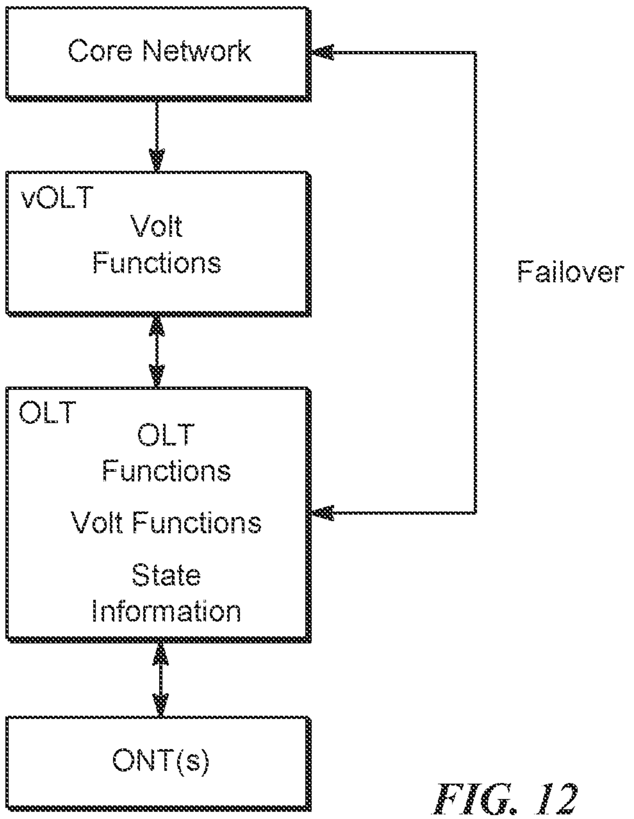
FIG. 12 illustrates a failover for an access network with a vOLT.

Referring to FIG. 12, it was determined that the OLT and vOLT preferably include a failover mode, that upon a loss of connectivity and/or processing by the vOLT, that the OLT takes over such processing that was previously performed by the vOLT. The vOLT includes a set of functions (e.g., vOLT functions), such as control layer functionality, that it performs. The OLT includes a set of functions (e.g., OLT functions), such as MAC layer and PHY layer functionality, that it performs. The combination of the functions provided by the vOLT (e.g., vOLT functions) and provided by the OLT (e.g., OLT functions) are sufficient to send and receive data from the ONTs, together with the control and configuration of such ONTs, where the vOLT functions and OLT functions are different from one another, at least in part.

The OLT preferably further includes a set of vOLT functionality (e.g., vOLT functions), at least in part, that match those of the vOLT in terms of functionality. The vOLT functionality is preferably included on the OLT, although its operation may be suspended in some manner or otherwise not used while connectivity and processing between the OLT and the vOLT is operational. The OLT also preferably includes sufficient state information that is periodically updated based upon information from the vOLT, that is sufficient at least in part, for the operation of the vOLT functionality. When the OLT and/or vOLT determines an interruption in the processing and/or connectivity between the vOLT and OLT, a failover mode may be used where the data is provided from the core network to the OLT in a manner bypassing the vOLT and the OLT provides data to the core network in a manner bypassing the vOLT. When the OLT initiates processing of the data in a manner bypassing the vOLT, the state information that has been previously obtained together with the vOLT functionality, may be used in a manner to reduce the duration of the interruption for the corresponding ONTs.

Figure 13:
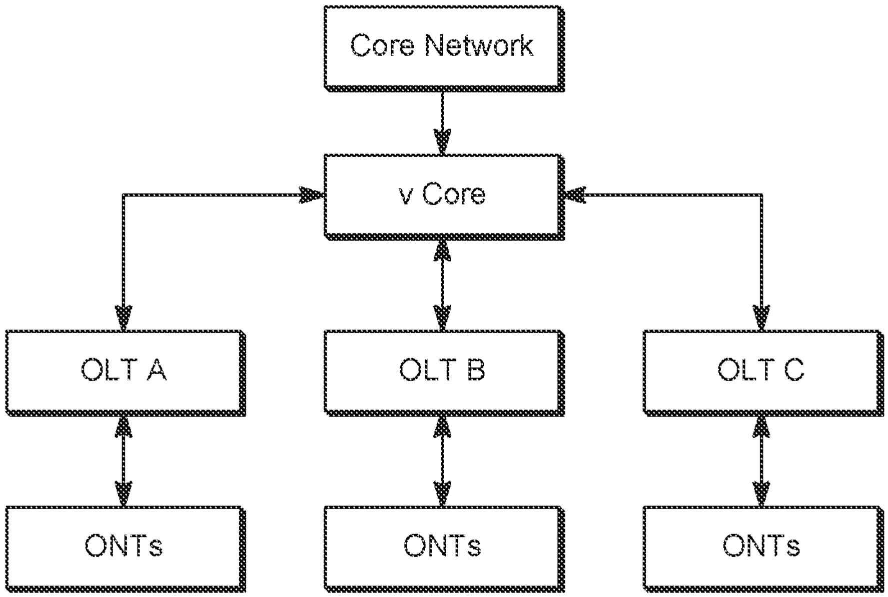
FIG. 13 illustrates a vOLT that manages different OLTs.

Referring to FIG. 13, a core network may be interconnected to a vOLT which is in turn provides processing services for a plurality of OLTs. Each of the plurality of OLTs provide interconnectivity with a corresponding set of ONTs. Over time the OLTs that are installed in an access network are different in their characteristics, including for example, the amount of memory, storage, power consumption, and/or processing capabilities. For example, OLT A may include relatively limited memory and relatively limited processing capabilities. For example, OLT B may include relatively more memory and relatively more processing capabilities than OLT A. For example, OLT C may include substantial memory and substantial processing capabilities, such as substantially more than OLT A and OLT B. The OLT A, OLT B and OLT C are preferably managed in such a manner that accounts for different in the capabilities of the respective OLTs. For example, the vOLT may perform substantially additional processing on behalf of OLT A due to the limited computational capabilities of OLT A. In this manner, additional processing that may be performed on the OLT A is preferably virtualized and provided by the vOLT so that the OLT A may be as responsive as possible for the respective ONTs. For example, the vOLT may perform limited additional processing on behalf of OLT B due to the limited computational capabilities of OLT B. In this manner, limited additional processing that may be performed on the OLT B is preferably virtualized and provided by the vOLT so that the OLT B may be as responsive as possible for the respective ONTs. For example, the vOLT may not need to perform additional processing on behalf of OLT C due to the substantial computational capabilities of OLT C. In this manner, no more than a base level of virtualization is provided by the vOLT on behalf of OLT C so that the OLT C may be as responsive as possible for the respective ONTs. The vOLT would may provide additional virtualized services for OLT A and OLT B, with respect to OLT C. As it may be observed, the vOLT may provide different virtualization functionality based upon the differences in the capabilities of the OLTs. In this manner, the OLTs preferably include as much functionality that they can perform without impacting the performance provided by the OLT to the respective ONTs and the vOLT. By way of example OLT C may be able to restore services to its respective ONTs after a system wide reboot of the ONTs in a manner faster than OLT A, and accordingly it is desirable for the vOLT to provide additional virtualized services for OLT A. Therefore, a higher overall responsiveness of the OLTs within the network may be achieved.

In general, the OLT whether it operates with virtualized or non-virtualized components, is often deployed outside of a humidity-controlled air conditioned environment at the location of the core network where a technician is not available with a diagnostic computer to determine whether the OLT is operating properly and troubleshoot any issues that may arise during its testing, installation, upgrade, modification, repair, or otherwise. For a centralized OLT, typically including a chassis and a set of blades each of which supports PON transceivers, when a blade ceases to operate properly, it is replaced with a new blade, the fibers are moved from the removed blade to the new blade, the blade it booted, the power levels are verified, and the technician confirms the connections to the ONTs are good, including suitable ranging. If particular ONTs did not automatically reconnect to the new blade, the technician can use available tools to troubleshoot any issues to reconnect one or more ONTs to the new blade.

With deployments of OLTs outside such a controlled environment, a technician who only occasionally attempts to install the OLT, typically a remote-OLT, may encounter additional difficultly in properly testing, installation, upgrade, modification, repair, or otherwise, especially without all the diagnostic equipment that is typically available at the location of the core network. As a result, a technician typically installs a remote-OLT, confirms it booted properly, confirms the transmission power levels, and that there are no current faults. This confirmation that the remote-OLT is operational is typically based on an illuminated light emitting diode. The remote-OLT may include a light emitting diode indicting upstream communication with the head end has been established, and a light emitting diode indicating downstream communication with an ONT has been established. At this point, the technician would consider the work related to the remote-OLT completed.

In addition to confirming a remote-OLT booted properly, the transmission power levels are proper, and no faults occurred, it is desirable to verify that the OLT has properly ranged each of the ONTs (i.e., accounting for different distances between the remote-OLT and ONTs due to its physical location which results in different timing signaling requirements) and that traffic connections are established for upstream communications and downstream communications with all the desirable ONTs interconnected to the remote-OLT. However, the illumination of the light emitting diode does not provide such information of whether particular ONTs are properly sending and receiving data from the remote-OLT. To determine such information, the remote technician installing the remote-OLT needs to place a call to the technician at the head end to run diagnostics to make such a determination, which is time consuming and problematic. Also, due to security considerations it may be undesirable to include a plug-in connector to access the remote-OLT and facilitate troubleshooting using such a plug-in connector, while a wireless interconnection (e.g., Bluetooth, WiFi) may not raise such security considerations.

Figures 14, 15:
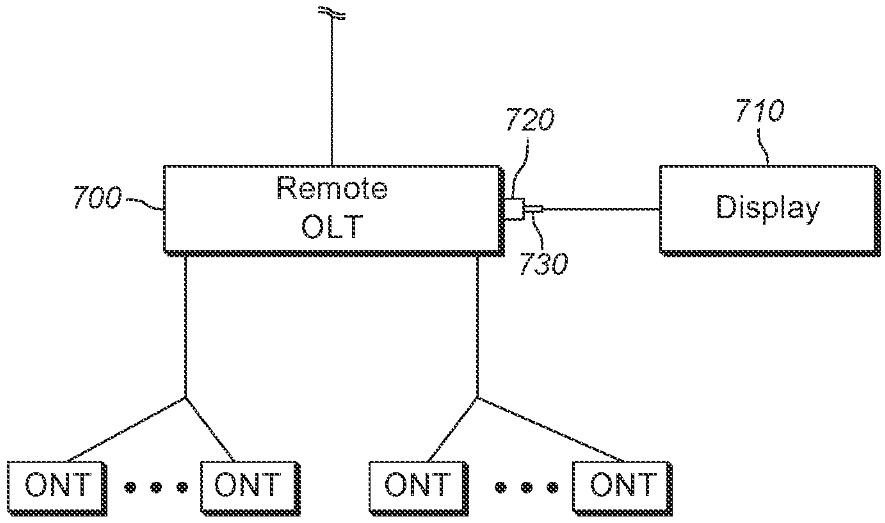
FIG. 14 illustrates a display interconnected to a remote OLT.
FIG. 15 illustrates a status database.

Referring to FIG. 14, a modified remote-OLT 1000 may include an external display 1010 attached to or otherwise a display interconnection 1020, that enables a display with a corresponding display interconnection 1030 to be detachably interconnected to the remote-OLT. The remote-OLT 1000 may be configured to provide messages to the display 1010 regarding the status of the remote-OLT (e.g., whether powered up and operational), configuration of the remote-OLT (e.g., various parameters related to its configuration), operational state of the remote-OLT (e.g., including upstream and downstream power levels and data communications), and status of any ONTs interconnected thereto such as whether they are properly ranged and communication is established. For example, the remote-OLT may provide data to the display to present each of the various messages. However, to reduce security considerations, it is undesirable that the display is capable of sending data to the remote-OLT that may be used to configure it in any manner. The technician may view the data being presented on the display 1010 to assist in troubleshooting the remote-OLT and confirm it is operating properly, including the corresponding access network.

While the remote-OLT may provide some status of its current operation, the technician who is working on the remote-OLT has no information available from the remote-OLT regarding the number of ONTs that should be interconnected to the remote-OLT. After working on the remote-OLT, it is desirable that all of the ONTs that should be interconnected thereto are confirmed to be interconnected so that data can be exchanged. However, when ONTs are removed from the network such as when a customer ceases their service, an ONT is exchanged with another ONT at a location to replace a defective ONT, or otherwise the network is changed over time in some manner, the OLT would not be providing service to the removed ONT but nevertheless the ONT may still remain in the database associated with the OLT. By way of example, a technician at the head end may add an ONT manually to an associated OLT by entering its serial number along with configuration information. Once the ONT is manually added it is considered part of the access network associated with the OLT, even though it may never have been physically deployed or otherwise subsequently removed from the access network. Accordingly, it is difficult for the field technician to determine the appropriate number of ONTs that should be actively interconnected with the OLT.

The remote technician may observe a number of ONTs that are in communication with the OLT to send and receive data. However, one or more of the ONTs may be in various states of initialization so the list of 'active' ONTs may not be representative of the total number of ONTs that should be active on the access network. For example, the ONTs may include a series of different states, such as, Initial state (O1); Standby state (O2); Serial Number state (O3); Ranging state (O4); Operation state (O5); POPUP state (O6); and Emergency Stop state (O7). Accordingly, without the additional information regarding one or more of the different states, it is difficult to determine the overall status of the OLT and its interconnected ONTs. However, one or more of the operational states of the respective ONTs are preferably available to the remote technician, such as through the display.

With all the ambiguities regarding the number of active ONTs, especially due to non-active ONTs that remain in the database despite having been removed from the network, and the various states that an ONT may be in especially as a result of work being done on the ONT, results in difficult ensuring all the desired ONTs are subsequently active.

Referring to FIG. 15, the remote-OLT, the OLT, and/or the head end may maintain a status database that is periodically automatically updated based upon the operational status of the ONTs provided services by a particular OLT, namely, those ONTs that are active (e.g., sending and/or receiving data of some type). The status database may also include a time when the latest time that the ONTs was active that was recorded in the status database. The status database is preferably periodically updated, such as hourly or daily, with those devices that are "active" within the network. In this manner, the database maintains a relatively recent time that each of the ONTs was active on the network.

Figures 16, 17:
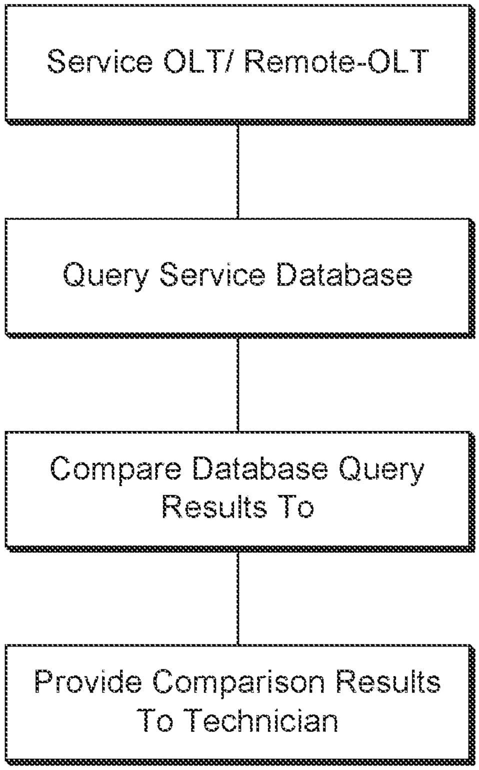
FIG. 16 illustrates another status database.
FIG. 17 illustrates a message based upon a status database query.

Referring to FIG. 16, the status database may periodically check whether each of the ONTs are active or not active on the access network. In this manner, the system may determine a historical data set indicting when each of the ONTs was either active or not active on the access network. For example, there may be times that the subscriber has disconnected or otherwise powered off their ONT, or the ONT is otherwise not available.

Referring to FIG. 17, the remote-OLT, the OLT, and/or the head end after working on the remote-OLT and/or OLT may query the status database together with determining which ONTs are considered to be active to determine whether the same number of ONTs are active for the remote-OLT and/or OLT after such working. For example, if 10 ONTs were active prior to the service work and 10 ONTs are active after the service work, the technician may be signaled that the active ONTs were successfully connected to. Also, the remote-OLT and/or OLT may query the status database together with determining which ONTs are considered to be active to determine whether the same identifiers for ONTs are active for the remote-OLT and/or OLT after such working. For example, if 10 particular ONTs were active prior to the service work and the same 10 particular ONTs are active after the service work, the technician may be signaled that the particular active ONTs were successfully connected to.

Which of the ONTs are considered to be active may be based upon any suitable criteria, such as those that are indicated as having been active within the past 2 days or less. Also, one or more of the various states of an ONT may be used to determine whether the ONT is considered active.

Whether the appropriate number and/or particular identification for the ONTs have become active after working on the remote-OLT and/or OLT may be indicated by the display. Whether the appropriate number and/or particular identification for the ONTs have become active after working on the remote-OLT and/or OLT may be indicated a visual indicator, such as a LED, on the remote-OLT and/or OLT. Whether the appropriate number and/or particular identification for the ONTs have become active after working on the remote-OLT and/or OLT may be indicated by a message accessible by the technician being interconnected to the network, the remote-OLT and/or the OLT with a computing device, such as a laptop or a mobile phone. If desired, each remote-OLT may include a unique password for direct interconnection by the technician using a computing device.

The vOLT management function can operate in a software defined network or network functions virtualization based cloud environment, which is used in conjunction with portions of a physical optical line terminal. Utilizing a vOLT within optical networks facilitates networks that may use a so-called "white-box" OLT device, off-the-shelf and insert it into their network. Once installed in the network, the vOLT can be integrated utilizing software platforms. As such, the vOLT may be considered an augmentation layer for the physical OLT, and provides a proxy to the vOMCI.

The vOMCI may be considered to provide a management protocol that provisions the optical network terminals using an OMCI object model.

Each of the functions related to the ONTs capabilities and management are described, to a greater or lesser extent, by various standards in a terse manner that are, typically arrived at by consensus of a diverse set of entities, each of which tends to have a different viewpoint on the meanings of the description in the standards. Accordingly, each of the ONTs and especially those developed by different manufacturers, may have variations based upon the particular manufacturer's interpretation of the various standards. This tends to be especially true for the control and management functions.

The G.988 standard describes managed entities of a protocol-independent management information base (MIB) that models the exchange of information between OLT and ONT in a PON-based access network that are subject to a standard, such as for example, G.988. See, G.988: ONU management and control interface (OMCI) specification, (11/17); G.988 (2017) Amendment 1 (11/18); G.988 ((2017) Amendment 2 (O8/19); G.988 (2017) Amendment 3 (O3/2); and G.988 (2017) Amendment 4 (O9/21), each of which is incorporated by reference herein in its entirety. G.988 also addresses the ONT management and control channel (OMCC) setup, protocol, and message formats. In addition to interpretation considerations by various manufacturers of the G.988 standard, it is also not often sufficient for complete interoperability between different OLT and ONT manufacturers. There exist various ONTs that are simply not compliant with the various standards because of manufacturer decisions on their implementation.

Figure 18:
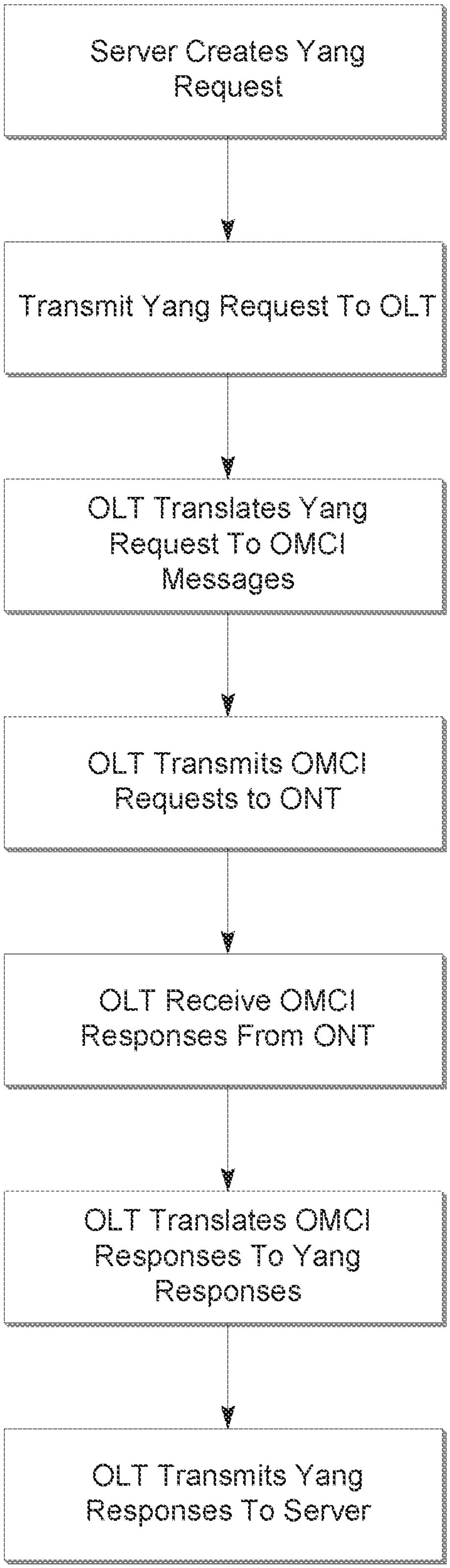
FIG. 18 illustrates processing for YANG data models using OMCI.

Referring to FIG. 18, one technique to provide an OMCI message to the ONT is for a server at the core network (i.e., any server within the network), to create a virtual OMCI set of microservices that are especially tailored to the functionality for each ONT model of each vendor. The management data maintained by the system is typically defined in terms of YANG data models that comprise modules and submodules that define configuration and state data, notifications, and remote procedure calls for. A YANG module defines a data model through its data, and the hierarchical organization of and constraints on that data. Each module is uniquely identified by a namespace URI. A module defines a single data model. However, a module can reference definitions in other modules and submodules by using the import statement to import external modules or the include statement to include one or more submodules. Additionally, a module can augment another data model by using the augment statement to define the placement of the new nodes in the data model hierarchy and a when statement to define the conditions under which the new nodes are valid. A module uses a feature statement to specify parts of a module that are conditional and the deviation statement to specify where the device's implementation might deviate from the original definition. In this manner, a module can have a large complex set of conditions that accommodate various environments. The core network provides the YANG requests to the OLT which then translates the YANG requests and responses and notifications to and from a vOLTMF (vOLT Management Function) into the OMCI messages, and the OLT transmits and receives the OMCI message requests and responses and notifications to and from the ONT.

Figure 19:
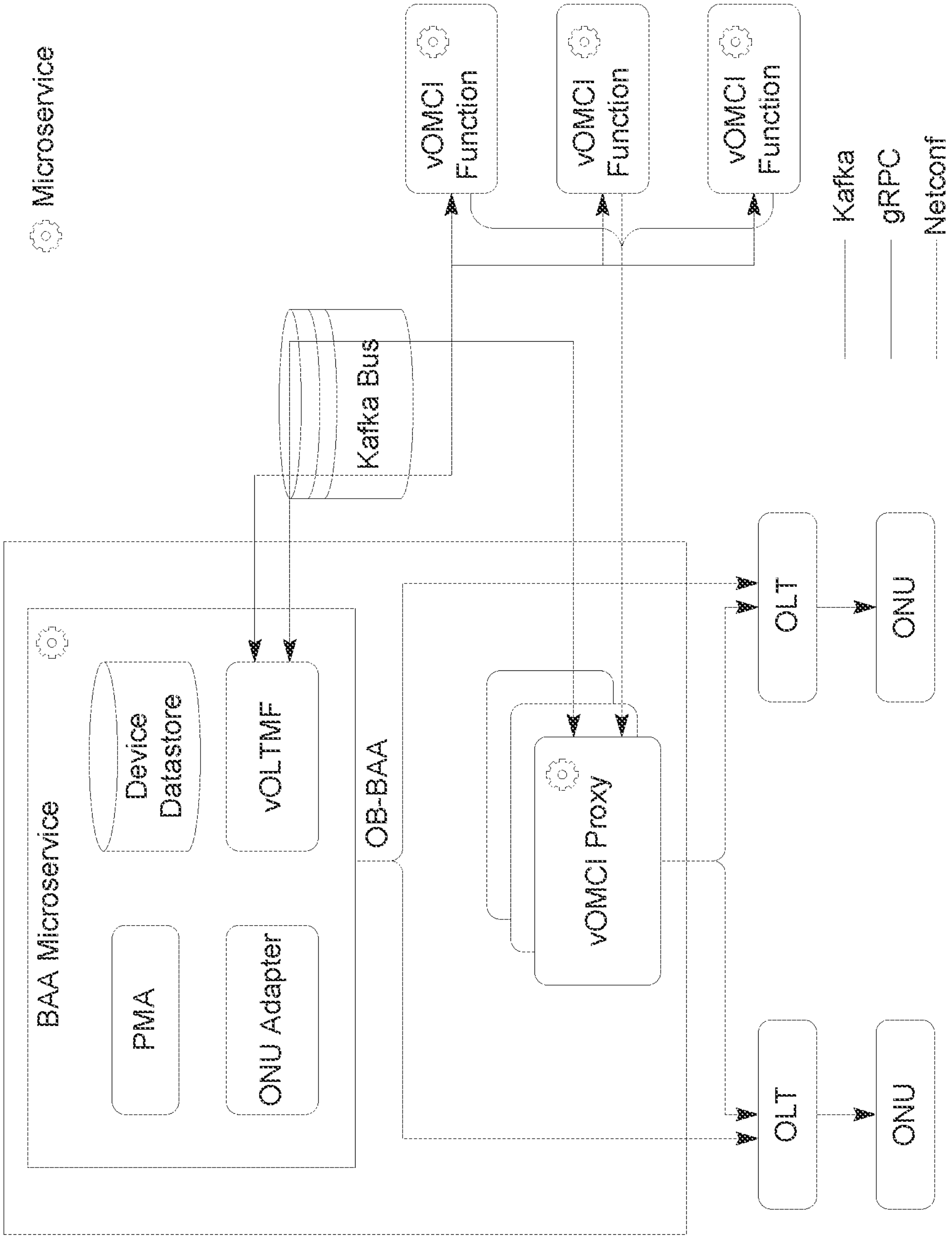
FIG. 19 illustrates processing for PON networks.

Referring to FIG. 19, a high-level design of a vOLT Management Function (vOLTMF) that may be used to manage ONTs through vOMCI messages is illustrated. There is communication between the vOLTMF, vOMCI Proxy, and vOMCI function based upon creating and deleting ONTs, receiving ont-state-change notifications, and sending requests to ONTs. The vOLTMF manages ONTs through a ONT adapter that may be deployed as broadband access abstraction, the association of which is based on the model, type, vendor, and version mentioned while creating the ONT. The ONT adapter may use a library of the YANG modules for ONTs that the vOLTMF refers to for handling ONT requests, responses, and notifications from external management systems.

The vOLTMF performs actions upon receiving notifications and requests either from an OLT device or other components within the broadband access abstraction core. For example, the onu-state-change notification that is sent by the OLT device on its Northbound Interface (NBI) that is received by broadband access abstraction core. The broadband access abstraction core propagates the notification towards vOLTMF and broadband access abstraction NBI so that it can be handled by the Access SDN M&C.

Upon reception of the notification, the vOLTMF processes the notification, checks if a preconfigured ONU device exists and authenticates the ONU, the vOLTMF transforms the notification to Google Protobufs (GPB) format and propagates the set-onu-communication Action towards the vOMCI function and vOMCI-proxy via the Kafka bus.

All the YANG requests are sent towards the vOMCI function and vOMCI Proxy via the Kafka bus in GPB format. Once the vOMCI function/Proxy processes the requests, the vOMCI function sends the notification/request response in GPB format back to the vOLTMF via the Kafka bus and the response is received through the KafkaNotificationCallback#onNotification( ).

Upon receiving the response, the vOLTMF is responsible for processing the response and performs actions accordingly.

There could be multiple interactions between the vOLTMF and the vOMCI function including parallel configuration requests/commands for either the same or different ONUs. These interactions are parallel and asynchronous such that the requests are not idle/blocked while waiting for responses because the vOLTMF has separate task queues and threadpools to handle the request/response interactions. The following shows the list of vOLTMF threadpools that spawned as new Runnable tasks, namely, processNotificationRequestPool, kafkaCommunicationPool, kafkaPollingPool, processNotificationResponsePool, and processRequestResponsePool. processNotificationRequestPool is used for processing the mediated device event listener callbacks and device notification requests. kafkaCommunicationPool is used to process individual GET/COPY-CONFIG/EDIT-CONFIG requests inside a MediatedDeviceNetconfSession spawned by preocessRequestResponsePool. kafkaPollingPool is used to tart up the KafkaConsumer implementation and polling for responses from vOMCI-function/vOMCI Proxy. processRequestResponsePool is used for processing notification responses from the vOMCI-function/vOMCI Proxy. The processRequestResponsePool is used for processing GET/COPY-CONFIG/EDIT-CONFIG requests and responses from the vOMCI-function/vOMCI Proxy. In general, the process may be considered a type of protocol adapter to one that operates on an ONT that also works with an OLT in a PON environment. As it may be observed, the manner in which the processing is performed is relatively complex, including Google Protobufs, remote procedure calls, and other complications that require a substantial amount of computational resources to process all the microservices which are burdensome for the OLT.

Figure 20:
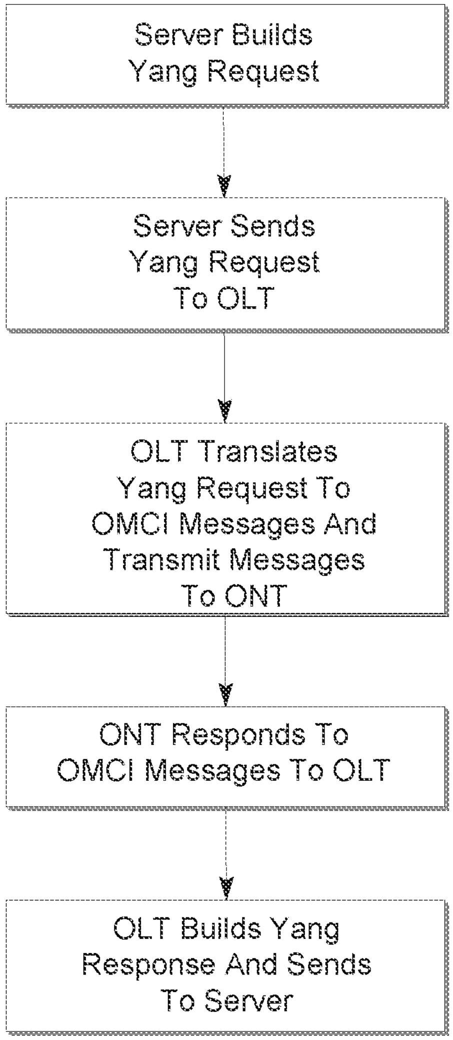
FIG. 20 illustrates YANG requests and responses.

Referring to FIG. 20, in general, the server builds or otherwise selects a YANG request for the ONT. The server then provides the YANG request to the OLT which translates the YANG request to OMCI messages and transmits such OMCI messages to the ONT. The OLT receives OMCI messages from the ONT, and translates them to YANG responses which are provided to the server.

Figure 21:
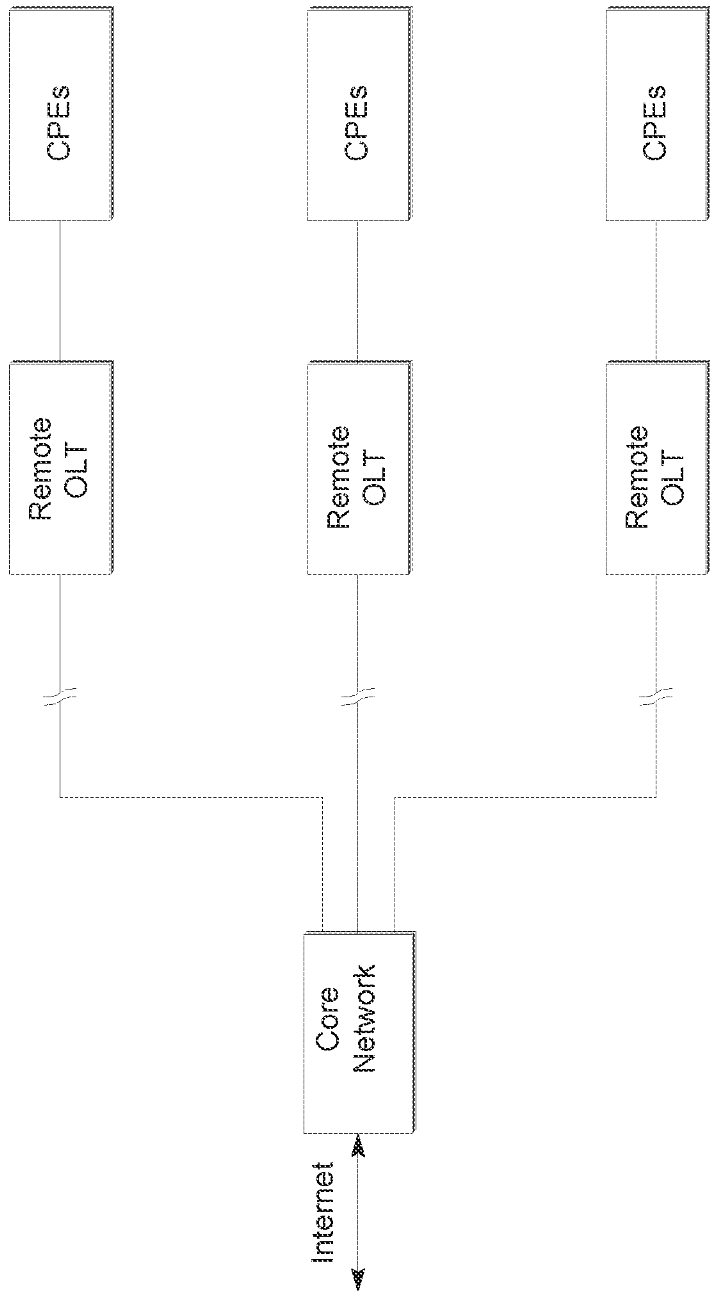
FIG. 21 illustrates a PON network with remote OLTs.

Referring to FIG. 21, in many access networks there are a plurality of remote OLTs that are interconnected to the core network, each of which provides services to a corresponding set of ONTs.

Figure 22:
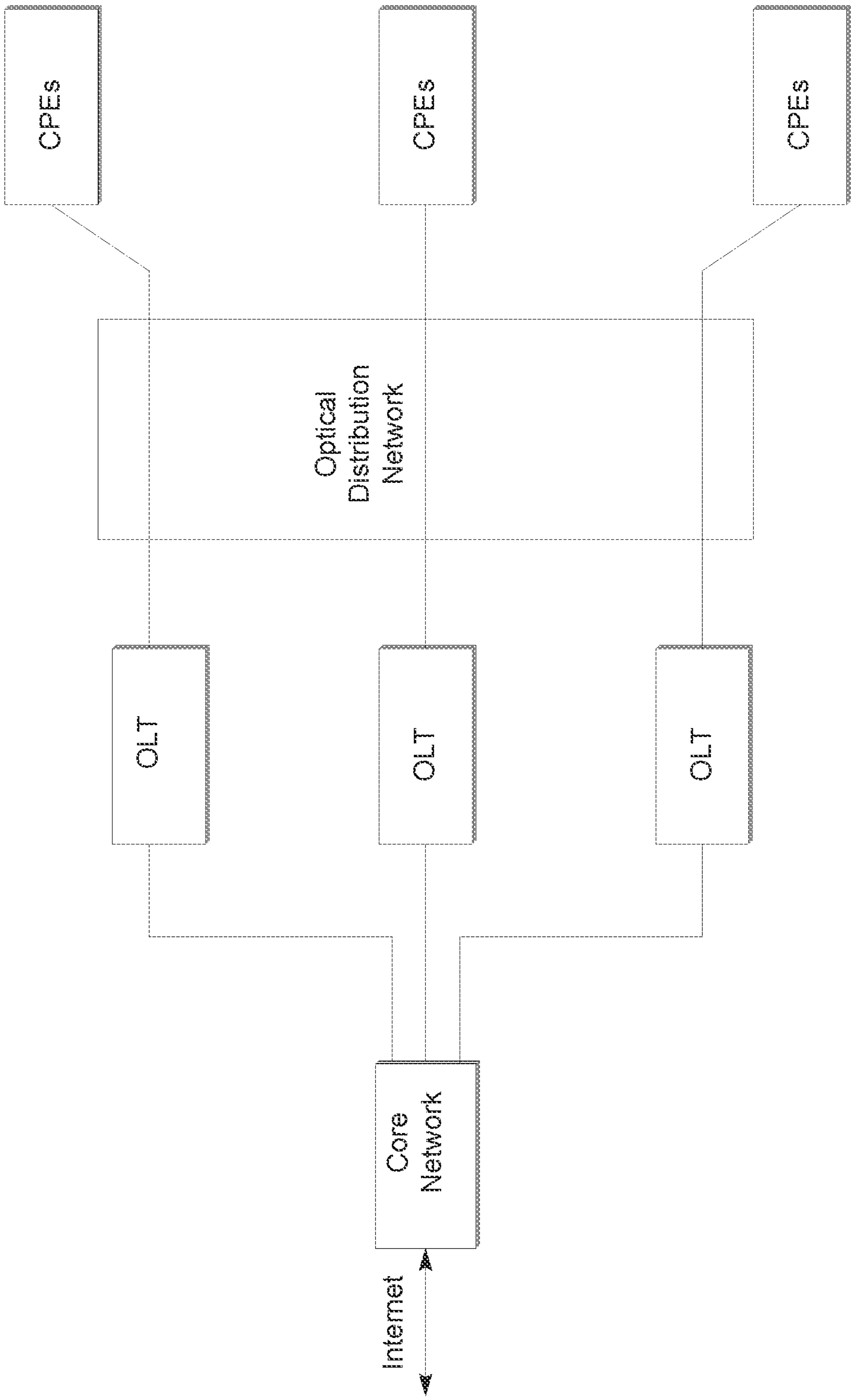
FIG. 22 illustrates a PON network with OLTs.

Referring to FIG. 22, in many access networks there are a plurality of OLTs that are co-located and interconnected to the core network, each of which provides services to a corresponding set of ONTs.

The OLT may include a data plane, which controls how data is processed, inclusive of dynamic bandwidth allocation, which are located on the respective OLT. The OLT may include a control plane which provides control over how the data plane processes the data, such as information in a routing table that defines what to do with incoming data. The OLT may include a management plane, that configures, monitors, and provides management, monitor, and configuration services to the control plane and the data plane. The control plane, or portions thereof, for a particular OLT may be virtualized and executed by the core network, with the remaining control plane being executed by the OLT. For example, the vOLT and/or the vOMCI may be virtualized and executed by the corresponding core network. The management plane, or portions thereof, for a particular OLT may be virtualized and executed by the core network, with the remaining management plane being executed by the OLT. The data plane, or portions thereof, for a particular OLT may be virtualized and executed by the core network, with the remaining data plane being executed by the OLT. Preferably, most if not all of the data plane is executed by the OLT. Preferably, most of the control plane is executed by the core network. Preferably, most if not all of the management plane is executed by the core network.

The OMCI and/or the OLT management function are often implemented as a microservice on the remote OLT and/or OLT. The remote OLT and/or OLT often have limited computational resources and/or limited available power usage, especially when a limited amount of power is provided through the interconnected data cables. By way of example, when all or a substantial portion of the ONTs associated with a remote OLT and/or OLT reset at the same time due to some type of network interruption, the OMCI and OLT management function each use a substantial amount of computational resources when reconfiguring all the network settings and data interconnections. The substantial amount of computational resources that are used may cause textended interruptions in the ability of the remote OLT and/or OLT to function properly or otherwise significantly delaying the amount of time needed to restore data services to the ONTs.

Figure 23:
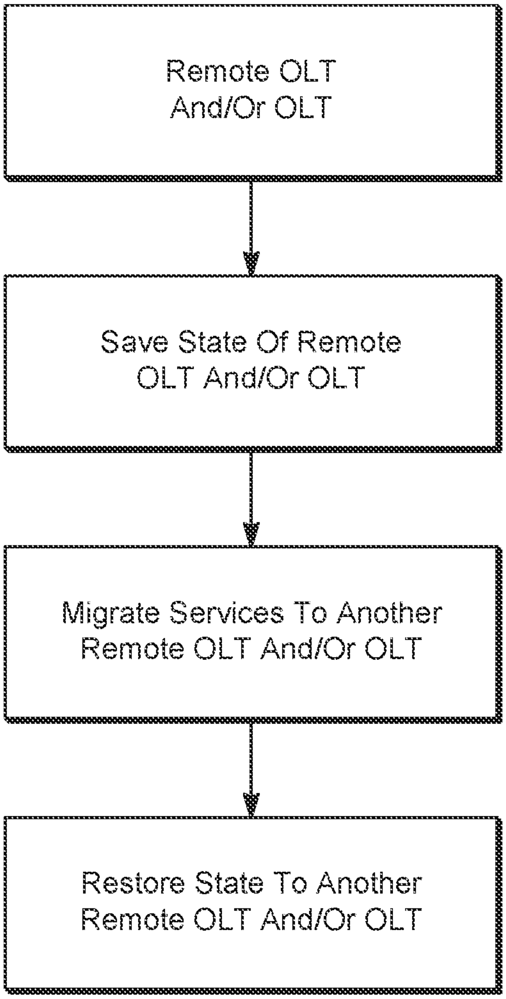
FIG. 23 illustrates a migration of services to another remote OLT and/or OLT.

Referring to FIG. 23, to increase the computational resources available for a particular remote OLT and/or OLT, it was determined that the services currently running on a particular remote OLT and/or OLT may be moved to another device, such as another remote OLT and/or OLT. This is especially the case for those services related to providing services to the corresponding ONTs. The service running on the current remote OLT and/or OLT may save its current state to a storage medium, or in memory, and the service may be migrated to the other remote OLT and/or OLT. After migrating the services, the state is restored based upon the previously stored stateful information and the network interconnections are restored. The migrated services, which may be virtualized if desired, which are operating on a remote OLT and/or OLT may be used to provide services for the previous remote OLT and/or OLT.

Figure 24:
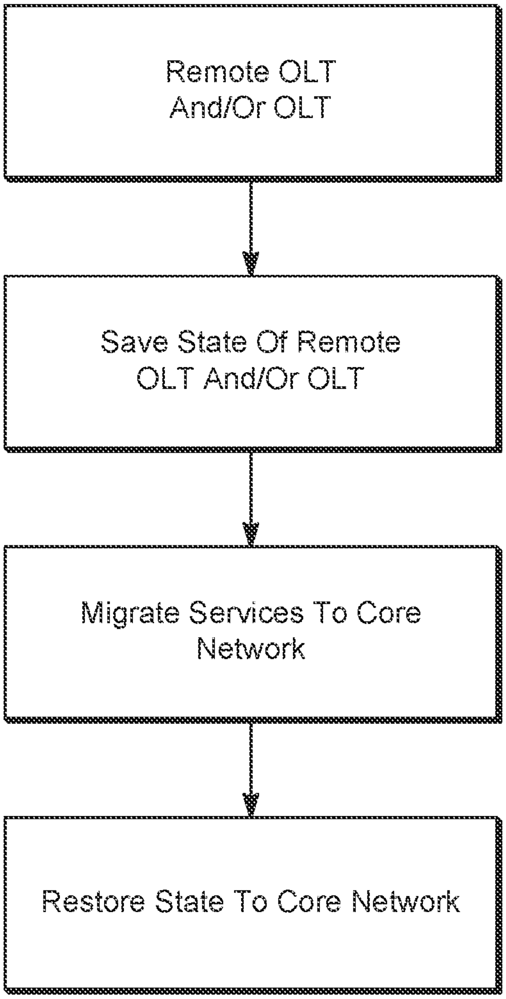
FIG. 24 illustrates a migration of services to a core network.

Referring to FIG. 24, to increase the computational resources available for a particular remote OLT and/or OLT, it was determined that the services currently running on a particular remote OLT and/or OLT may be moved to another device, such as the core network. This is especially the case for those services related to providing services to the corresponding ONTs. The service running on the remote OLT and/or OLT may save its current state to a storage medium, or in memory, and the service may be migrated to the core network. After migrating the services, the state is restored based upon the previously stored stateful information and the network interconnections are restored. The migrated services, which are preferably virtualized, which are operating on the core network may be used to provide services for the previous remote OLT and/or OLT. In addition, services provided by the core network may in a similar manner be migrated to the remote OLT and/or OLT.

Figure 25:
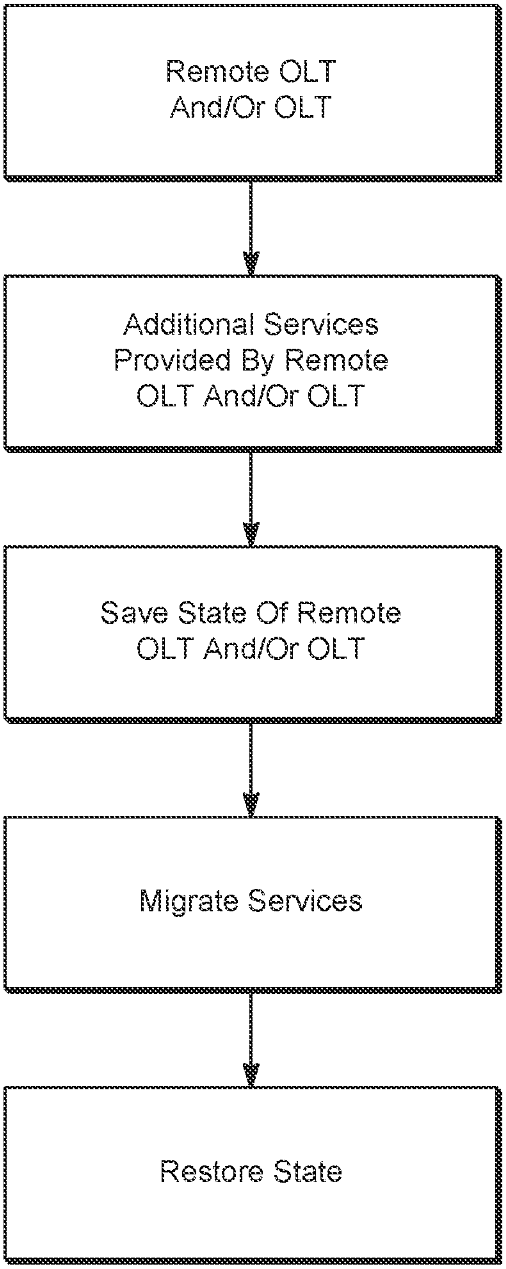
FIG. 25 illustrates a migration of services from a remote OLT and/or OLT.

Referring to FIG. 25, in another embodiment the services may be initially deployed on the remote OLT and/or OLT to provide data services to the initial set of ONTs. Over time, as additional ONTs are added to the access network serviced by the remote OLT and/or OLTs, together with additional services that are supported, the computational resources for such services tends to burden the remote OLT and/or OLT in such a manner that data services may be impacted. In this case, it is desirable to migrate the services on the remote OLT and/or OLT to the core network (or another remote OLT and/or OLT) as a set of virtual services, such as vONT and/or vOMCI. In this manner, the computational resources provided by the remote OLT and/or OLT do not need to be oversized to accommodate the mere potential of significant additional services to be provided in the future.

Figure 26:
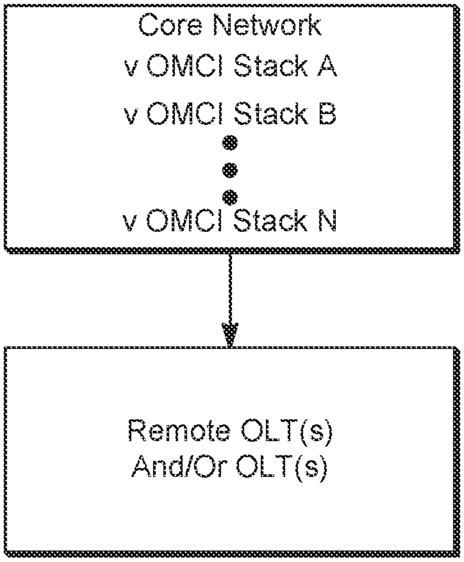
FIG. 26 illustrates a core network with multiple vOMCI stacks.

Referring to FIG. 26, in another embodiment it was determined that the vOMCI operating on the core network, which may be inclusive of cloud based networking services, may need to support more than one OMCI object model because of differences in the ONTs that may be included within the network. For example, part of the ONTs may be supported by ITU-T G.988 while other of the ONTs may be supported by OpenOMCI, including variations thereof. Normally, even with the variations in the messaging, the protocol messages are carried over an Onu Management and Control Channel (OMCC) and may encapsulated into frames, such as GEM (GPON Encapsulation Method) frames. In this manner, the core network may provide multiple vOMCI stacks for a particular remote OLT and/or OLT. In this manner, the core network may provide a first type of vOMCI stack for one or more remote OLTs and/or OLTs, a second type of vOMCI stack for another one or more remote OLTs and/or OLTs, and so forth.

The services that are provide on the remote OLT and/or OLT are preferably included with a container, such as a Docker container, and managed with a respective orchestration system, such as Kubernetes. In this manner, the orchestration system may manage the migration of services from one computing device to another.

Figure 27:
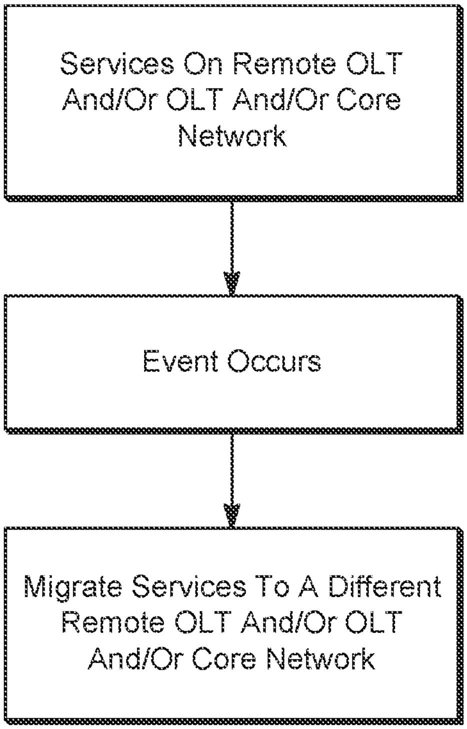
FIG. 27 illustrates the migration of services based upon an event.

Referring to FIG. 27, the migration of services between the remote OLT and/or OLT and/or core network may be performed in manner that is at least partially manual, such as based upon command line instructions. Preferably the remote OLT and/or OLT and/or core network migrates one or more services based upon the occurrence of an event. For example, one or more services may be migrated based upon a time of day, such as to the core network early in the morning and to the remote OLT and/or OLT late in the evening. For example, one or more services may be migrated based upon a failure of one of the remote OLTs and/or OLTs, to another remote OLT and/or OLT and/or core network. For example, one or more services may be migrated based upon a processing load incurred by the remote OLTs and/or OLTs over a time period, to another remote OLT and/or OLT and/or core network. For example, one or more services may be migrated based upon restarting of a set of ONTs, to another remote OLT and/or OLT and/or core network.

In some environments, it is desirable that the services are migrated from a source device to destination device, and then migrate the services back from the destination device to the source device. As a result of the migration of the services between the same devices, it is desirable that the container on the source device is not removed by the orchestration system, but rather placed in a standby state. With the container placed in a standby state, when the services are migrated from the destination device back to the source device, the migration may be performed without involvement of the orchestration system. In this manner, the migration of services may be accelerated with less computational resources being used.

Figure 28:
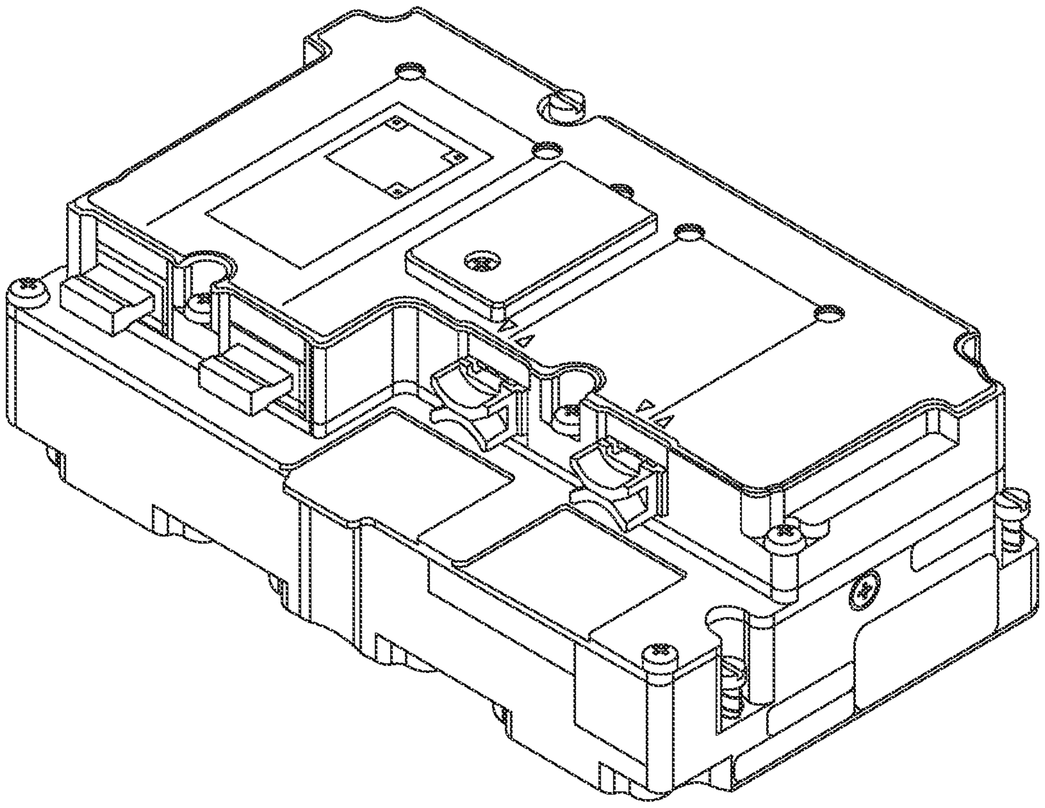
FIG. 28 illustrates a top view of an exemplary OLT housing.
Figure 29:
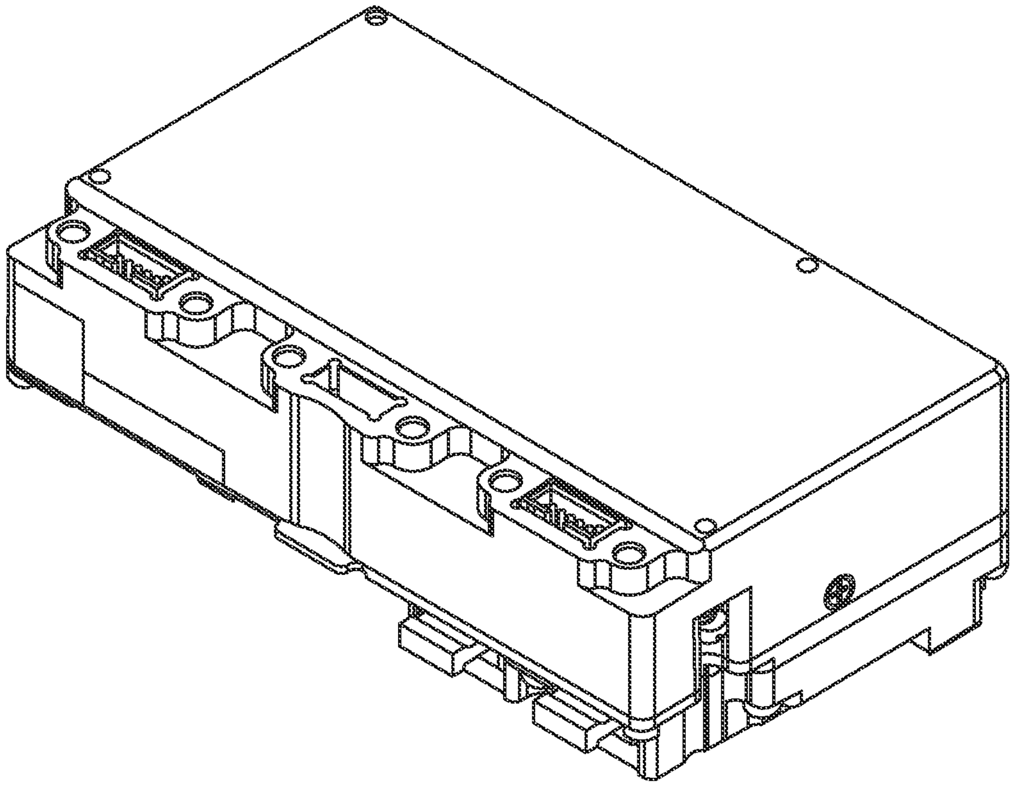
FIG. 29 illustrates a bottom view of an exemplary OLT housing.

Referring to FIG. 28 and FIG. 29, an exemplary top and bottom, respectively, of an optical line terminal housing is illustrated. The effective operation of the optical line terminal is dependent on the ambient temperature within the housing of the optical line terminal. If the temperature within the optical line terminal is to high, then the optical line terminal itself may fail, thus requiring a technician to inspect the optical line terminal to determine the source of the high temperature. If the temperature within the optical line terminal is sufficiently high, then the optical line terminal may not operate in a reliable manner. To reduce the temperature within the optical line terminal some type of physical and/or electrical modification should be performed to reduce the temperate levels within the housing.

Figure 30:
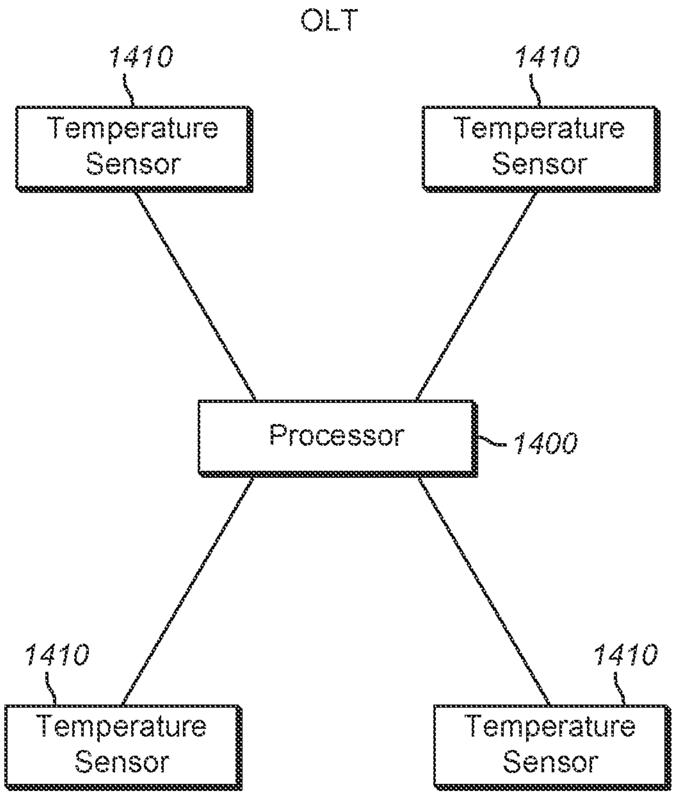
FIG. 30 illustrates an OLT with a processor and temperature sensors.

Referring to FIG. 30, the optical line terminal may include a processor 1400 that is interconnected to a plurality of temperature sensors 1410, each of which is located at a different position within the optical line terminal. The processor 1400 may receive signals from the respective temperature sensors 1410 to determine a measure of the temperature within the housing. The temperature sensor(s) may send data indicating the temperature or otherwise data from which the processor determines the temperature(s). For example, the processor 1400 may determine a maximum temperature, a minimum temperature, an average temperature, a medium temperature, a temperature at each of the temperature sensors, a gradient across two or more of the temperature sensors, or any other statistical measure of the temperature within the housing based upon the data from the temperature sensors 1410.

Figure 31:
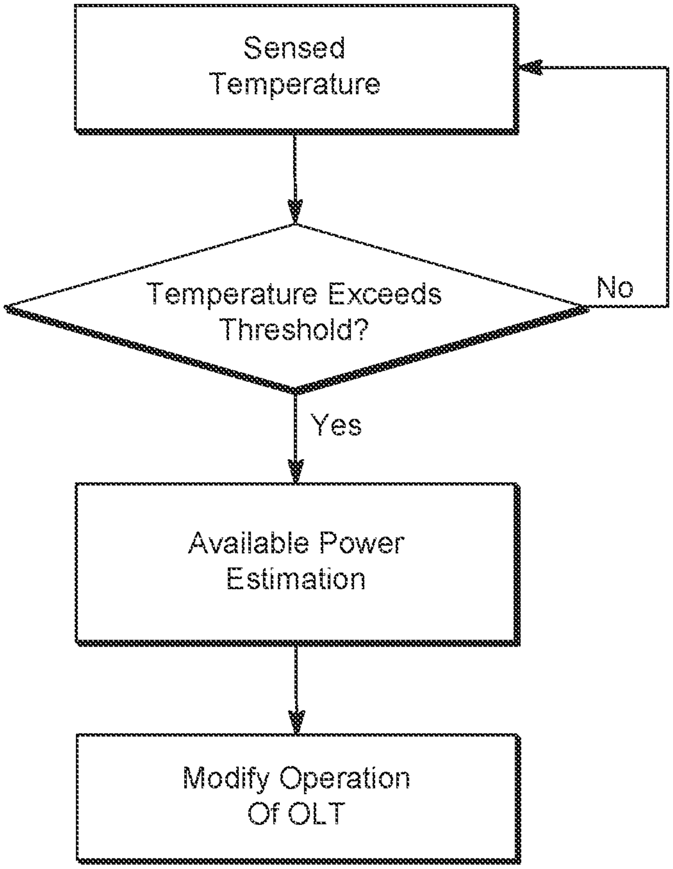
FIG. 31 illustrates modification of the operation of the OLT based upon the temperature sensors.

Referring to FIG. 31, if the processor determines that the sensed temperate exceeds a threshold then the processor may modify the operation of the optical line terminal in order to reduce the temperature within the OLT housing. The processor may also estimate or otherwise have awareness of the available power that the optical line terminal has available. For example, for an optical line terminal interconnected to "wall power", the available power may be considered to be all that is needed. For example, for an optical line terminal provided power through one of the access network interconnections, then the available power is limited to the power being provided through the access network interconnection. Based upon the sensed temperature and the available power budget, for those power budgets that are limited in some manner, the OLT modifies its operation. Also, if the processor determines that the sensed temperate is lower than a threshold then the processor may modify the operation of the optical line terminal in order to increase the temperature within the OLT housing, which may further be based upon a power budget, if desired.

One source of substantial power usage by an OLT is the power used for transmission of the optical signals to the ONTs. When the temperature is above a threshold level, the OLT may select a lower transmit power for the optical signals. In this manner, the power used by the OLT will be reduced, and in turn because of the reduction in the OLTs power usage, the temperature within the OLT will likewise be reduced. If the available power to the OLT is limited, the OLT further checks to ensure that the change in the transmission power levels does not result in the OLT exceeding its available power. Also, when the temperature is below a threshold level, the OLT may select a higher transmit power for the optical signals. In this manner, the power used by the OLT will be increased, and in turn because of the increase in the OLTs power usage, the temperature within the OLT will likewise be increased. If the available power to the OLT is limited, the OLT further checks to ensure that the change in the transmission power levels does not result in the OLT exceeding its available power.

One source of substantial power usage by an OLT is the power used for transmission of the signals to the core network on its north bound interfaces, especially in the case when the OLT has a plurality of north bound interfaces. When the temperature is above a threshold level, the OLT may disable one or more of the north bound interfaces but less than all of the north bound interfaces. In this manner, the power used by the OLT will be reduced, and in turn because of the reduction in the OLTs power usage, the temperature within the OLT will likewise be reduced. If the available power to the OLT is limited, the OLT further checks to ensure that the change in the number of enabled north bound interfaces does not result in the OLT exceeding its available power. Also, when the temperature is below a threshold level, the OLT may enable one or more of the north bound interfaces that were otherwise previously disabled. In this manner, the power used by the OLT will be increased, and in turn because of the increase in the OLTs power usage, the temperature within the OLT will likewise be increased. If the available power to the OLT is limited, the OLT further checks to ensure that the change in the number of enabled north bound interfaces does not result in the OLT exceeding its available power. The enabling and/or disabling a particular north bound interface may be achieved in any manner, such as not sending and/or receiving data on a particular north bound interface or otherwise enabling and/or disabling the associated electronics and/or software associated with a particular north bound interface.

One source of substantial power usage by an OLT is the power used for an associated data rate for transmission of the optical signals to the ONTs. When the temperature is above a threshold level, the OLT may select a lower data rate for the optical signals. In this manner, the power used by the OLT will be reduced, and in turn because of the reduction in the OLTs power usage, the temperature within the OLT will likewise be reduced. If the available power to the OLT is limited, the OLT further checks to ensure that the change in the transmission power levels does not result in the OLT exceeding its available power. Also, when the temperature is below a threshold level, the OLT may select a higher data rate for the optical signals. In this manner, the power used by the OLT will be increased, and in turn because of the increase in the OLTs power usage, the temperature within the OLT will likewise be increased. If the available power to the OLT is limited, the OLT further checks to ensure that the change in the transmission data rate does not result in the OLT exceeding its available power. By way of example, the data rate may be modified by the reducing the transmission data rate to the ONTs by transmitting less data over time.

One source of substantial power usage by an OLT is the power used for processing the received optical data from the ONTs. When the temperature is above a threshold level, the OLT may select a lower data rate of received optical signals from the ONTs. In this manner, the power used by the OLT will be reduced, and in turn because of the reduction in the OLTs power usage, the temperature within the OLT will likewise be reduced. If the available power to the OLT is limited, the OLT further checks to ensure that the change in the processing of the received data does not result in the OLT exceeding its available power. Also, when the temperature is below a threshold level, the OLT may select a higher data rate of received optical signals from the ONTs. In this manner, the power used by the OLT will be increased, and in turn because of the increase in the OLTs power usage, the temperature within the OLT will likewise be increased. If the available power to the OLT is limited, the OLT further checks to ensure that the change in the processing of the received data does not result in the OLT exceeding its available power. By way of example, the data rate may be modified by the dynamic bandwidth allocation reducing the transmission of data from the ONTs.

In many cases, the OLT includes a field programmable gate array or other programmable device that provides (e.g., processor) the processing for sending data to the ONTs, and the processing for sending data to the core network. In this manner, the processor may be considered to have a generally static operational power for its basic operations and dynamic operational power for other data processing or otherwise network management processing. Accordingly, with a lower data rate the corresponding processing performed by the processor is reduced, and the corresponding temperature within the housing is likewise reduced. Accordingly, with a higher data rate the corresponding processing performed by the processor is increased, and the corresponding temperature within the housing is likewise increased. Also, when a port is disabled or enabled, the corresponding processing performed by the processor may likewise be reduced (or otherwise suspended) or increased, respectively, and the corresponding temperature within the housing is likewise decreased or increased, respectively.

Also, the OLT may include a plurality of functionality that may be performed, as desired, such as those illustrated in FIG. 5. The OLT may selectively disable (or otherwise suspend) or enable, the corresponding functionality being performed by the OLT may, and the corresponding temperature within the housing is likewise decreased or increased, respectively. In this manner, the thermal management within the OLT may be modified by selectively providing different functionality.

The temperature management may be based upon the particular temperature sensor, and its associated components proximate thereof. For example, a first temperature sensor may be associated with optics for port 0. For example, a second temperature sensor may be associated with optics for port 1. For example, a third temperature sensor may be associated with a first north side interface. For example, a fourth temperature sensor may be associated with the laser (s). For example, a fifth temperature sensor may be associated with the processor. For example, a sixth temperature sensor may be associated with memory. For example, a seventh temperature sensor may be associated with a second north side interface. One or more other temperature sensors may be associated with any other suitable aspect of the OLT. Based upon the temperature sensed by a particular temperature sensor, the decision of what particular modification is appropriate may be selected.

Also, the OLT may include a plurality of functionality that may be performed, as desired, such as those illustrated in FIG. 5. The OLT may selectively virtualize or de-virtualized, the corresponding functionality being performed by the vOLT or OLT, respectively. In this manner, the service may be moved from the OLT to the vOLT (or otherwise) which reduces the processing to be performed by the OLT and the corresponding temperature within the housing is likewise decreased. In this manner, the service may be moved from the vOLT to the OLT (or otherwise) which increases the processing to be performed by the OLT and the corresponding temperature within the housing is likewise increased. In this manner, the thermal management within the OLT may be modified by selectively providing different virtualization of the functionality.

Figure 32:
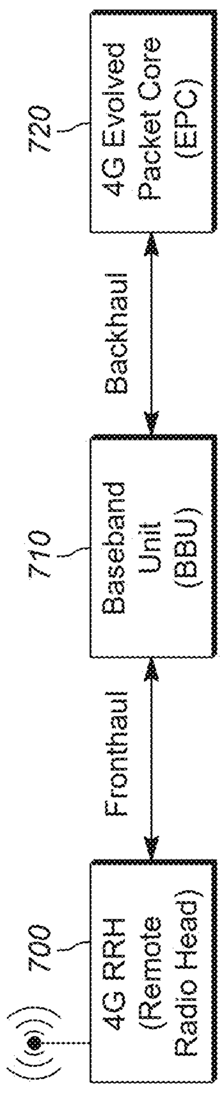
FIG. 32 illustrates a 4G network.

Referring to FIG. 32, for wireless based networks, such as a 4G cellular network, a 4G remote radio head 1700 sends and receives wireless signals to other devices, such as mobile devices (e.g., iPhone). The remote radio head 1700 is interconnected to a baseband unit 1710. The data interconnection between the remote radio head 700 and the baseband unit 1710 is referred to as fronthaul. The remote radio head 1700 remains at the cellular site with the antenna. The baseband unit 1710 is located at a more centralized location to serve multiple remote radio heads 1700. Each of the baseband units 1710 is interconnected to an evolved packet core 1720. The interconnection between the baseband unit 1710 and the evolved packet core 1720 is referred to as backhaul. Fronthaul and backhaul both play a part in connecting the end user or node to a network. A primary difference between fronthaul and backhaul is the part of the network the technology it is deployed on. Backhaul links the mobile network to the wired network, while fronthaul describes the network architecture that connects the remote cell sites to the baseband unit. In particular, the backhaul gets data from a remote location to a major network, such as the Internet or an enterprise network. 4G networks often are based upon a common public radio interface protocol.

Figure 33:
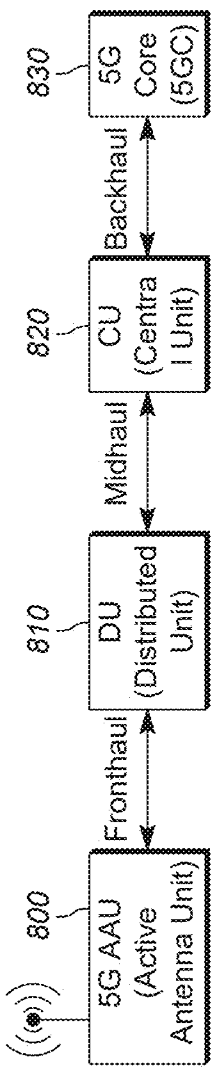
FIG. 33 illustrates a 5G network.

Referring to FIG. 33, for wireless based networks, such as a 5G cellular network, a 5G active antenna unit 1800 sends and receives wireless signals to other devices, such as mobile devices (e.g., iPhone). The active antenna unit 1800 is interconnected to a distributed unit 1810. The data interconnection between the active antenna unit 1800 and the distributed unit 1810 is referred to as fronthaul. The active antenna unit 1800 remains at the cellular site with the antenna. The distributed unit 1810 is located at a more centralized location to serve multiple remote radio heads 1700. The distributed unit 1810 is typically deployed on a server. The distributed unit 1810 is normally deployed close to the active antenna unit 1800 and it runs the RLC, MAC, and parts of the PHY layer. Each of the distributed units 1810 is interconnected a central unit 1820. The data interconnection between the distributed unit 1810 and the central unit 1820 is referred to as midhaul. The central unit, typically includes RRC, SDAP, and PDCP protocol layers, and is mainly responsible for non-real-time RRC, PDCP protocol stack functions. The central unit is often deployed on a server to support the integrated deployment of core network UPF sinking and edge computing. The central unit 1820 and the distributed unit 1810 may be connected through a F1 interface. The central unit 1820 may manage one or more distributed units 1810. The central unit 1820 is interconnected to the 5G Core 1830 using a backhaul interconnection. 5G networks often are based upon an open radio access networks (ORAN) protocol.

Unlike the midhaul and backhaul interconnections, the fronthaul interconnection, especially for 4G and 5G, includes timing considerations for signaling that passive optical networks are not inherently considered to support. For example, the handshaking between the user device and the baseband unit/4G evolved packet core/distributed unit/central unit/5G core have strict tolerances for a user device to initially access the cellular network. In this manner, the user device may make a request for access and if the response of a grant of access is to slow, the user device may make a new request for access, and if the response of a grant of access is to slow, the user device may make a new request for access, and so forth, thereby inhibiting the ability to effectively access the cellular network. Accordingly, if such timing considerations are not guaranteed or otherwise unlikely to occur on a regular basis, then PON is not especially suitable for the latest generation of cellular networks.

After consideration of cellular networks, one type of message is random-access channel (RACH) which is a shared channel used by wireless terminals to access the mobile network (TDMA/FDMA, and CDMA based network) for call set-up and bursty data transmission. Whenever a device wants to make an MO (Mobile Originating) call it schedules the RACH. RACH is transport-layer channel; the corresponding physical-layer channel is PRACH. A typical feature of a random-access channel is that messages are not scheduled (compared to, for example, a "dedicated channel" in UMTS, which is assigned exclusively to one user at a time).

After consideration of cellular networks, another type of message is a hybrid automatic repeat request (hybrid ARQ or HARQ) that is a combination of high-rate forward error correction (FEC) and automatic repeat request (ARQ) error-control. In standard ARQ, redundant bits are added to data to be transmitted using an error-detecting (ED) code such as a cyclic redundancy check (CRC). Receivers detecting a corrupted message will request a new message from the sender. In Hybrid ARQ, the original data is encoded with a FEC code, and the parity bits are either immediately sent along with the message or only transmitted upon request when a receiver detects an erroneous message. The ED code may be omitted when a code is used that can perform both forward error correction (FEC) in addition to error detection, such as a Reed-Solomon code. The FEC code is chosen to correct an expected subset of all errors that may occur, while the ARQ method is used as a fall-back to correct errors that are uncorrectable using only the redundancy sent in the initial transmission. As a result, hybrid ARQ performs better than ordinary ARQ in poor signal conditions, but in its simplest form this comes at the expense of significantly lower throughput in good signal conditions. There is typically a signal quality cross-over point below which simple hybrid ARQ is better, and above which basic ARQ is better. By way of example, HARQ is used in HSDPA and HSUPA which provide high speed data transmission (on downlink and uplink, respectively) for mobile phone networks such as UMTS, and in the IEEE 802.16-2005 standard for mobile broadband wireless access, also known as "mobile WiMAX". It is also used in Evolution-Data Optimized and LTE wireless networks.

A device may use RACH and/or HARQ messaging (or other suitable messaging depending on the network architecture) to establish a connection between the device and the mobile network, with relatively tight timing tolerances, where PON is used as a transport mechanism for the fronthaul that is modified to accommodate the stricter tolerances.

Figure 34:
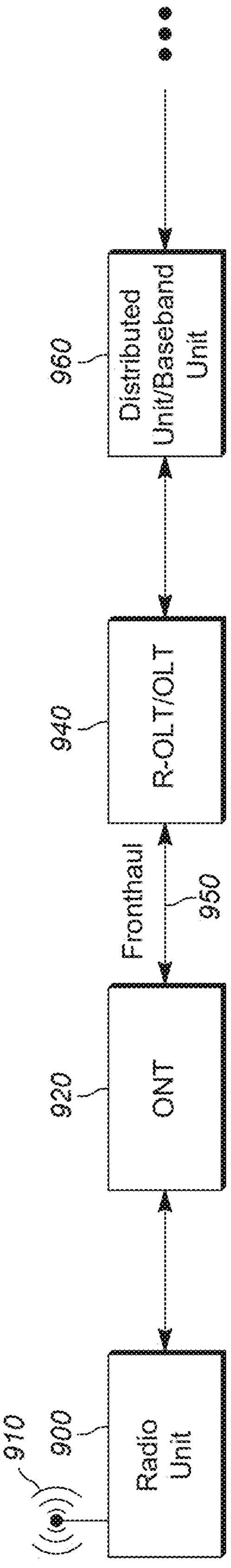
FIG. 34 illustrates a radio-based network.

Referring to FIG. 34, a radio unit 1900 receives messages from its associated antenna 1910. The radio unit 1900 inspects each of the received messages and tags or otherwise identifies each of the messages that correspond to a RACH and/or a HARQ message (or other suitable messages depending on the network architecture). An ONT (or OLT or remote-OLT, if desired) may receive the messages, including those messages that are identified as RACH and/or HARQ messages, for transmission using a passive optical network based protocol to one or more destinations, such as an remote optical line terminal/optical line terminal 1940 (or ONT, if desired) across a fronthaul interconnection 1950. The optical line terminal 1940 may provide the received data to a distributed unit or a baseband unit 1960, that may include the associated remote optical line terminal/optical line terminal 1940.

The distributed unit or a baseband unit 1960 receives messages from its associated central unit/evolved pack core (or otherwise). The distributed unit or a baseband unit 1960 inspects each of the received messages and tags or otherwise identifies each of the messages that correspond to a RACH and/or a HARQ message (or other suitable messages depending on the network architecture). The R-OLT/OLT 1940 may receive the messages, including those messages that are identified as RACH and/or a HARQ messages, for transmission using a passive optical network-based protocol to its destination, such as the ONT 1920 across the fronthaul interconnection 1950. The ONT 1920 may provide the received data to the radio unit 1900 which broadcasts the data using the associated antenna 1910.

Figure 35:
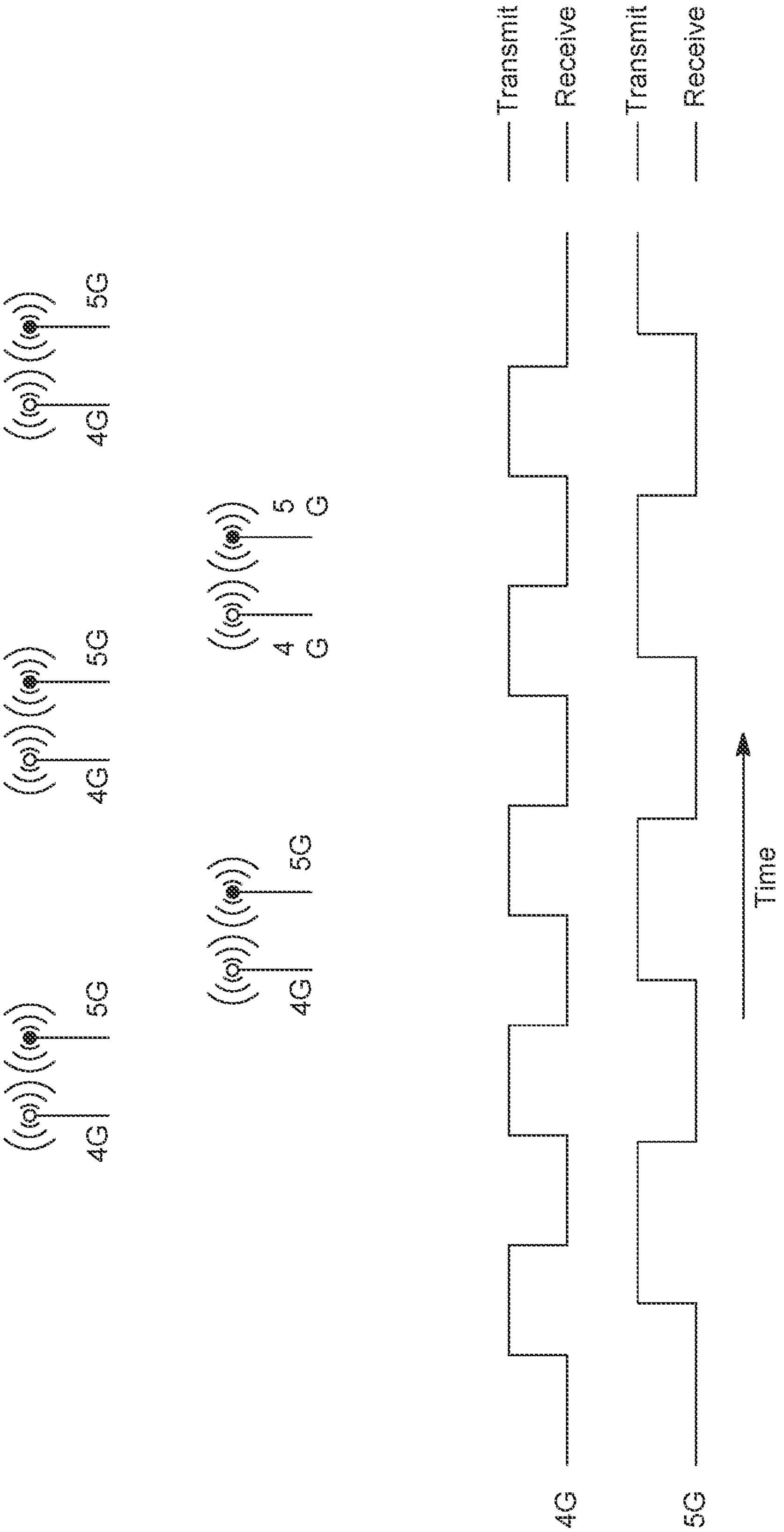
FIG. 35 illustrates 4G and 5G transmission and reception.

Referring to FIG. 35, the transmission by 4G cellular antennas operates in a manner that a group of geographically proximate antenna transmits data at the same time wirelessly to other devices and that the group of geographically proximate antenna receives data at the same time wirelessly from other devices. In this manner, the group of antennas are either in a transmission or receiving mode for the 4G cellular data. In this manner, the data across the 4G fronthaul network is primarily unidirectional at any point in time, when the connection is only between the baseband unit and the radio unit. In a similar manner the transmission by 5G cellular antennas operates in a manner that a group of geographically proximate antenna transmits data at the same time wirelessly to other devices and that the group of geographically proximate antenna receives data at the same time wirelessly from other devices. In this manner, the group of antennas are either in a transmission or receiving mode for the 5G cellular data. In this manner, the data across the 5G fronthaul network is primarily unidirectional at any point in time, when the connection is only between the baseband unit and the radio unit. In many implementations, the 4G and 5G cellular antennas are co-located on the same poles or other locations. However, the 4G and 5G cellular antennas are not generally aligned with one another for the transmission and receiving of data. At some times the 4G and 5G are both transmitting data. At some times the 4G and 5G are both receiving data. At some times the 4G is transmitting data and 5G is receiving data. At some times the 5G is transmitting data and 4G is receiving data.

Frames that are broadcast in the downstream direction travel to all end units. However, each of the end units must only accept frames that are intended for the end unit, which is ensured by the unique identifiers that are contained within the frame. Therefore, the data are processed only by the unit for which the data were determined. Time division multiplexing is often used for the upstream direction.

Frames in the downstream direction are composed of a physical control block downstream (PCBd). The length of the PCBd header is the same size for all transmission rates. If no data is requested for sending, the frames are forwarded in the downstream direction; the PCBd is also used for time synchronization.

In the upstream direction, time division multiple access techniques are typically used. By using this technique, the OLT assigns variable time intervals to the ONTs. The intervals are primarily used to synchronize the clustering of data that are transmitted in the upstream direction.

When PON is used in the environment of a fronthaul interconnection, there is typically one, or a limited number of, receiving devices for the data. In this environment, the fronthaul interconnection is more akin, in many implementations, as a point-to-point interconnection. With such a realization, it was determined that the frame could include a plurality of pre-allocated portions (e.g., payloads and allocated time) in the downstream direction and/or the upstream direction that are spaced apart from one another. Each of the pre-allocated portions may include the appropriate destination signalling, as appropriate. The data payload for each of the pre-allocation portions is limited to only including selected messaging such as the RACH message and/or the HARQ message (or other suitable messages depending on the network architecture). Other types of messages, such as those including general data, such as video streaming data or audio streaming data, is prohibited from using the pre-allocated portions.

The remote-OLT/OLT and/or ONT receives messages to be transmitted for a subsequent frame and identifies those that are especially time sensitive, such as the RACH message and/or the HARQ message. The time sensitive messages are transmitted in the next available pre-allocated portions of the current frame being transmitted, rather than waiting for a subsequent frame to transmit the messages. Accordingly, as the RACH messages and/or the HARQ messages are received, they may be transmitted without substantial temporal delay because the time slots for such transmission are already allocated. Also, with the pre-allocated portions of the current frame spaced out across a frame, the temporal delay is further reduced because the transmission does not need to wait for a subsequent frame. Further, when the RACH messages and/or the HARQ messages are received while the current frame is being transmitted, they may be sent within the current frame by making use of the pre-allocated portions of the current frame. It is noted that the pre-allocation of portions of the current frame by the remote-OLT/OLT is not in the response to a request to send data. It is noted that the pre-allocation of portions of the current frame by the ONT is not in the response to a request to send data. In this manner, there is no need for the request and grant process for the pre-allocated portions. By way of example, for the ONTs the pre-allocation may be provided in the form of pre-allocation of portions of the bandwidth map provided to the ONT, even when currently there is no such RACH messages and/or HARQ messages to be transmitted during those portions.

With an access network that includes cellular x-haul (fronthaul, mid-haul, and/or backhaul) that also includes passive optical networking-based interconnections for some or all of the data interconnections, it becomes increasingly complicated and desirable to be able to obtain analytics regarding the operation of the access network in increasingly granularity. By way of example, an issue may arise in the cellular networking portion of the network which manifests itself as an error in the passive optical networking portion of the network, making it increasingly problematic to determine the source of the issue. By way of example, an issue may arise in the passive optical networking portion of the network which manifests itself as an error in the cellular networking portion of the network, making it increasingly problematic to determine the source of the issue. A graphical user interface or a textual based file on a monitoring system running on a computer system may be used to represent the status and analytics of different portions of the network. In this manner, the operator may readily observe the status of the system, and receive warnings, alerts, and/or alarms, as desired. In general as used herein, alarm is intended to be an all inclusive term to indicate a potential or actual problem with the network and/or any of the devices interconnected thereto.

Referring to FIG. 36, to determine the health of the access network, it is desirable to obtain measurements of the power levels of the passive optical networking components at select locations. A transmission power level at the output of the remote-OLT/OLT may be measured and provided to the monitoring system. A receive power level at each of the ONTs may be measured and provided to the monitoring system. A transmission power level at the output of the ONT may be measured and provided to the monitoring system. A receive power level at the remote-OLT/OLT may be measured and provided to the monitoring system. By obtaining the transmission power levels and the receive power levels for remote-OLT/OLT to ONTs fiber optical connections, it may be determined whether the measured levels are within operating tolerances and whether the measured levels are near the edge of operating tolerances. Also, the measured values provide further indication of whether they are unanticipated drops in the power levels along the optical fibers which could indicate a physical problem with such optical fibers and/or one or more components interconnected therebetween. Further, by monitoring the transmission and reception power levels in both directions provides a better indication of the health of that portion of the access network. Alarm conditions may be provided to the operator through the monitoring system based upon the data.

By way of example, one output of a laser may be coupled to the optical fiber to provide the transmission of optical data. Another output of the laser may be coupled to a photodiode which senses the power levels, and provides feedback to the laser so that the laser has increased output stability over temperature and increased output stability as a result of aging over time. The output power level of the laser may be based upon the photodiode used for feedback.

Figures 37, 38:
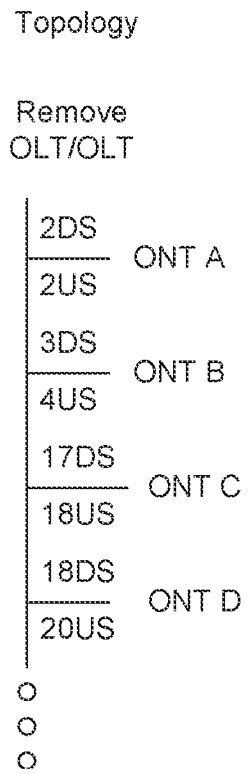
FIG. 37 illustrates bit error rate management.
FIG. 38 illustrates laser diode based bit error rate management.

Referring to FIG. 37, to determine the health of the access network, it is desirable to obtain measurements of the bit error rates of the passive optical networking components at select locations. A transmission bit error rate between the output of the remote-OLT/OLT and the input of each of the ONTs may be determined in both a downstream and an upstream direction. A transmission bit error rate between the output of each of the output of the ONTs and the input of the remote-OLT/OLT may be determined. The interconnection between the remote-OLT and each of the ONTs may be based upon topology information included within the remote-OLT/OLT/ONTs, or otherwise the monitoring system. By way of example, the remote-OLT/OLT may be interconnected to a series of ONTs that are interconnected along a primary fiber path. For example, a first ONT along the primary fiber path may have a low bit error rate, a second ONT along the primary fiber path may have a relatively high bit error rate, a third ONT along the primary fiber path may have a relatively higher bit error rate, and a fourth ONT along the primary fiber path may have an even relatively higher bit error rate. With the combination of the bit error rates for each of the ONTs together with the topology information, it may be determined that there is likely an issue with the second ONT along the primary fiber path causing issues for the second ONT, and subsequently the third ONT and the fourth ONT. The bit error rate may indicate a source of transmission related errors and the nature of such errors. Alarm conditions may be provided to the operator through the monitoring system based upon the data.

Referring to FIG. 38, it was further determined that as the temperature increases and/or the laser ages the current levels needed to achieve the desired output power levels increases. This increase in the current levels may result in an increase in the bit error rate for an interconnection. Accordingly, the monitoring system may correlate whether a sufficiently high bit error rate is coupled with a sufficiently high current level, indicating that the laser is likely a source of the increased bit error rate. Further, the system may monitor a bias current provided to the laser together with a modulation current provided to the laser to obtain further information related to the sufficiently high current level, indicating that the laser is likely a source of the increased bit error rate.

Referring to FIG. 39, one or more temperature sensors may be associated with each of the remote-OLT/OLT/and/or ONT, including components therein. Each of the temperature sensors may provide a temperature measurement and the monitoring system may include whether it is within acceptable ranges.

Referring to FIG. 40, one or more supply voltages may be associated with each of the remote-OLT/OLT/and/or ONT, including components therein. Each of the supply voltages may provide a voltage measurement and the monitoring system may include whether it is within acceptable ranges. By way of example, a lower supply voltage may indicate a failing component or a faulty repair.

When an alarm indication is near an edge-based condition, the alarm could go on/off/on/off repeatedly which is inconvenient to use for diagnostics. Preferably, the alarm (or otherwise) based condition includes some hysteresis so that there is a range below which an alarm (or otherwise) occurs and above which an alarm (or otherwise) occurs, with a range in the middle that does not trigger a change in the alarm state when going from lower to higher and from higher to lower. Also, the alarm (or otherwise) may require a sufficient "soak" time duration before being triggered and/or cleared. This further reduces the likelihood of the alarm (or otherwise) being turned on/off/on/off.

Figure 41:
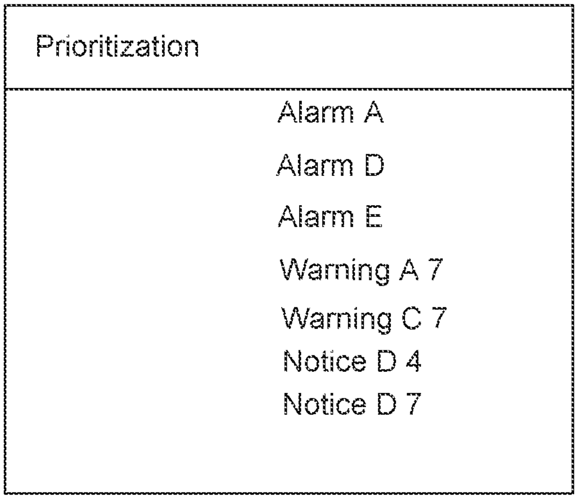
FIG. 41 illustrates alarm prioritization management.

Referring to FIG. 41, the monitoring system may prioritize the severity of the alarm conditions. The highest priority of alarm conditions are those impacting a substantial number of subscribers, such as a fiber optical link is out. A middle priority of alarm conditions are those likely impacting the quality of the service, such as supply voltages that are out of range. The lowest priority of alarm conditions are those that indicate parameters are not within the typical ranges.

Figure 42:
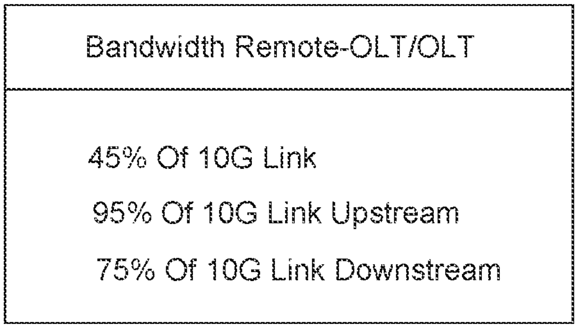
FIG. 42 illustrates bandwidth level management.

Referring to FIG. 42, the system may monitor bandwidth utilization, which may be oversubscribed, and provide an indication of bandwidth utilization over time. For example, the passive optical network may include a maximum of 10G. The monitoring system may provide an average bandwidth being used over time (e.g., 45% of 10G link). However, the passive optical network is providing x-haul for cellular networking which tends to have primarily either upstream data usage or downstream data usage, so an average bandwidth for the combination of upstream and downstream may not be optional. The monitoring system may provide an average upstream bandwidth being used over time while the passive optical network is primarily transmitting data in the upstream direction (e.g., 95% of 10G link in upstream direction). The monitoring system may provide an average upstream bandwidth being used over time while the passive optical network is primarily transmitting data in the downstream direction (e.g., 75% of 10G link in downstream direction). In this manner, the operator may determine the utilization of the potentially available bandwidth and make a determination whether additional bandwidth should be added or otherwise modify the network architecture.

Figure 43:
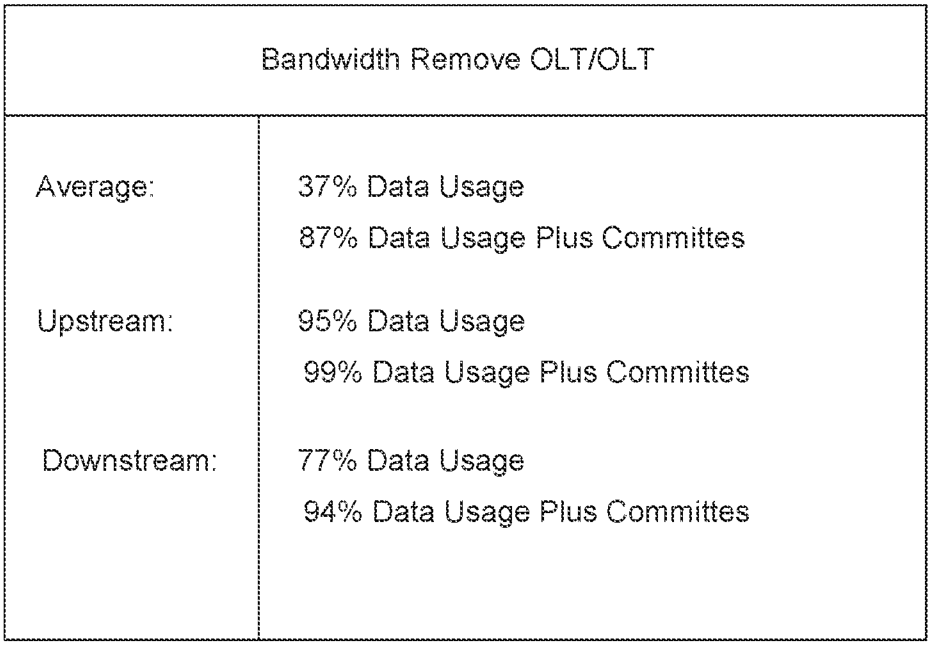
FIG. 43 illustrates bandwidth level management based upon service level agreements.

Referring to FIG. 43, while a measurement of overall bandwidth usage, a measurement of bandwidth usage in an upstream direction, and a measurement of bandwidth usage in a downstream direction provides useful metrics, it is also desirable to manage the bandwidth based upon bandwidth that is allocated to any particular customers. By way of example, for a select set of customers based upon their service level agreement, they may have a minimum fixed bandwidth that is always reserved for their usage. By way of example, a customer may have a minimum fixed bandwidth of 100 MB/s even if they are using less than their minimum fixed bandwidth. Accordingly, any unused bandwidth of customers that have a minimum fixed bandwidth allocation should further be considered to be consumed bandwidth because it is not available for other customers.

For fronthaul based communications, the remote-OLT/OLT may make a determination as to which antenna the data should be provided to in a region with relatively close antennas. The data may be provided to a selected one of the antennas based upon the available bandwidth among the antennas. In this manner, the dynamic bandwidth allocation performed by the remote-OLT/OLT may be modified based upon the data to be transmitted by the antenna and the available bandwidth among the different fronthaul interconnections.

Figure 44:
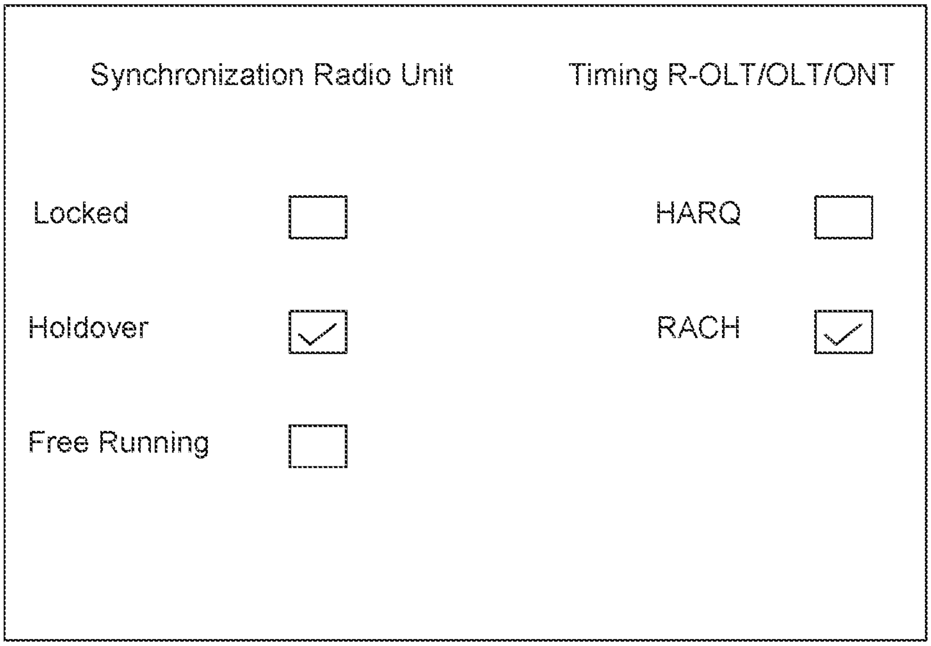
FIG. 44 illustrates synchronization and timing message management.

Referring to FIG. 44, the synchronization state of a radio unit may include, for example, "locked" (e.g., the timing of the radio unit synchronized to the cellular clock), "holdover" (e.g., the timing of the radio unit using the last synchronization), and "free running" (e.g., the timing of the radio unit not using the cellular synchronization). The synchronization state of the radio unit may be provided to the monitoring system, where the information may be used to make characterizations of the state of the cellular system. In addition to the synchronization state of the radio unit, it is desirable to also provide the information regarding the state of set-up type messages, namely, HARQ and RACH messages related to the remote-OLT/OLT/ONTs. For example, if the HARQ and RACH messages are being timely processed by the passive optical network, then it is likely that the set-up of the devices is operating in a suitable manner. For example, if the HARQ and RACH messages are not being timely processed by the passive optical network, then it is likely that the set-up of the devices is not operating in a suitable manner. The review of the cellular synchronization state in combination with the set-up type messages may provide insight into a potential source of errors, such that the cellular synchronization may be impacting the set-up type messages, of the set-up type messages are impacting the synchronization.

Figure 45:
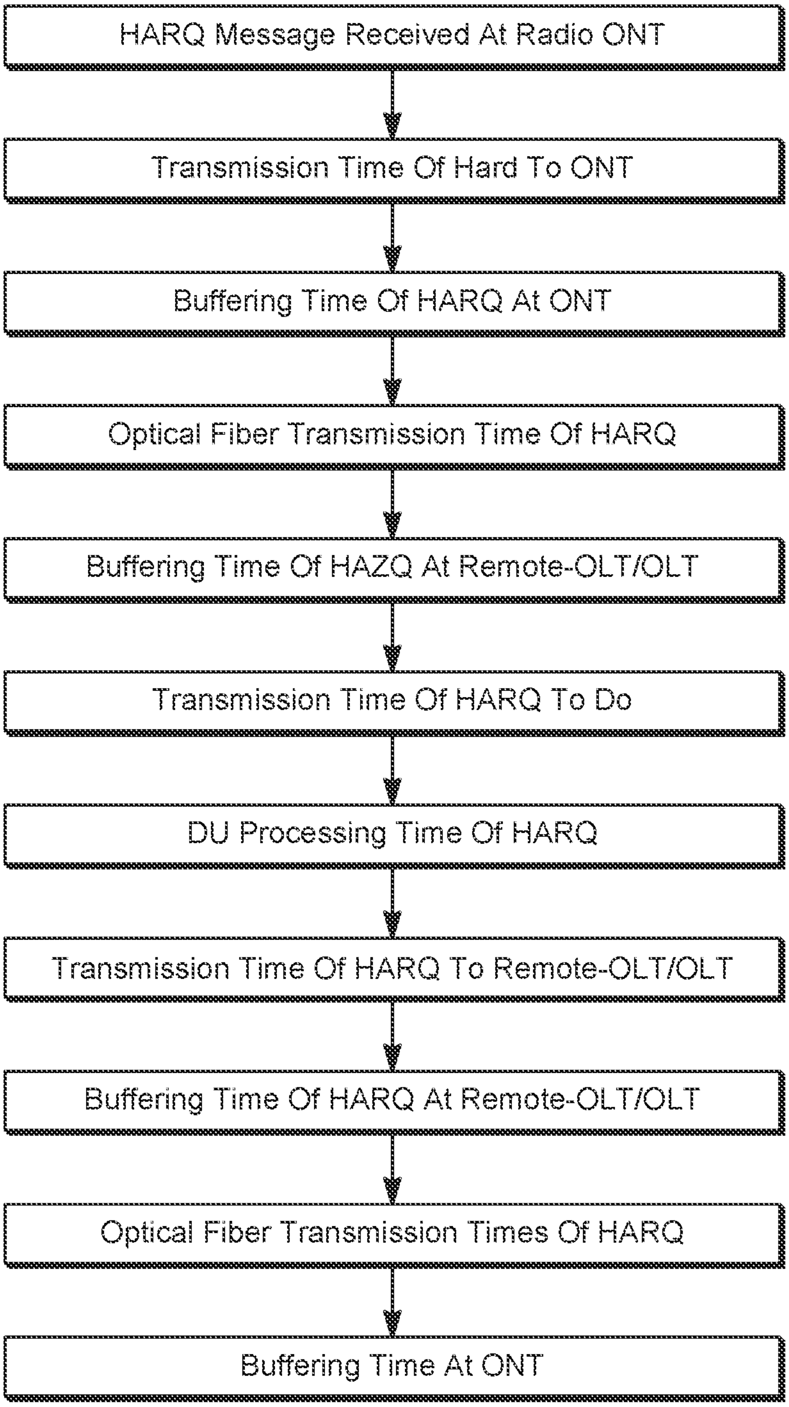
FIG. 45 illustrates buffering management.
Figure 46:
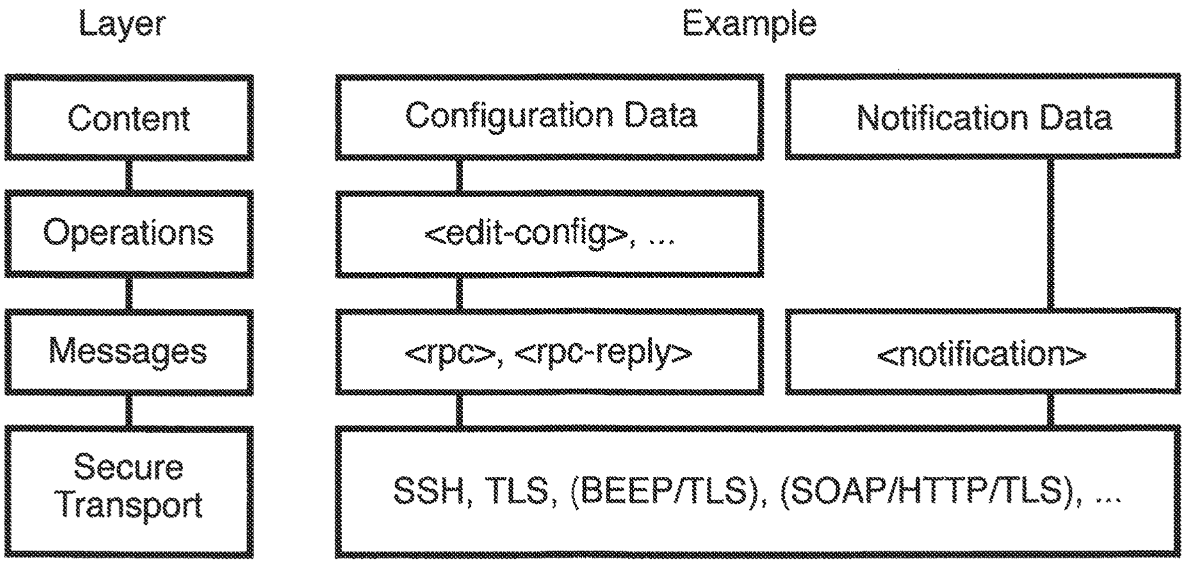
FIG. 46 illustrates exemplary NETCONF layers.
Figure 47:
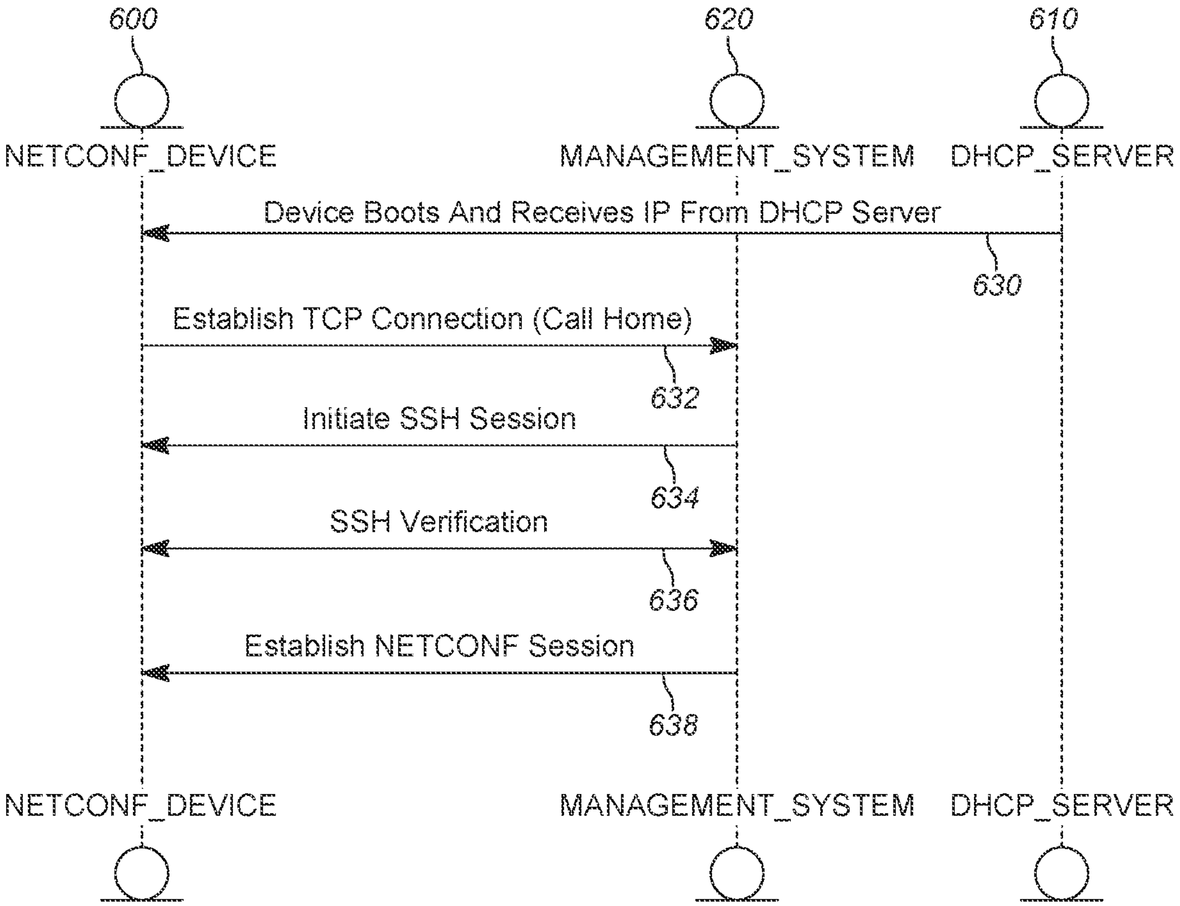
FIG. 47 illustrates an exemplary NETCONF connection.
Figure 48:
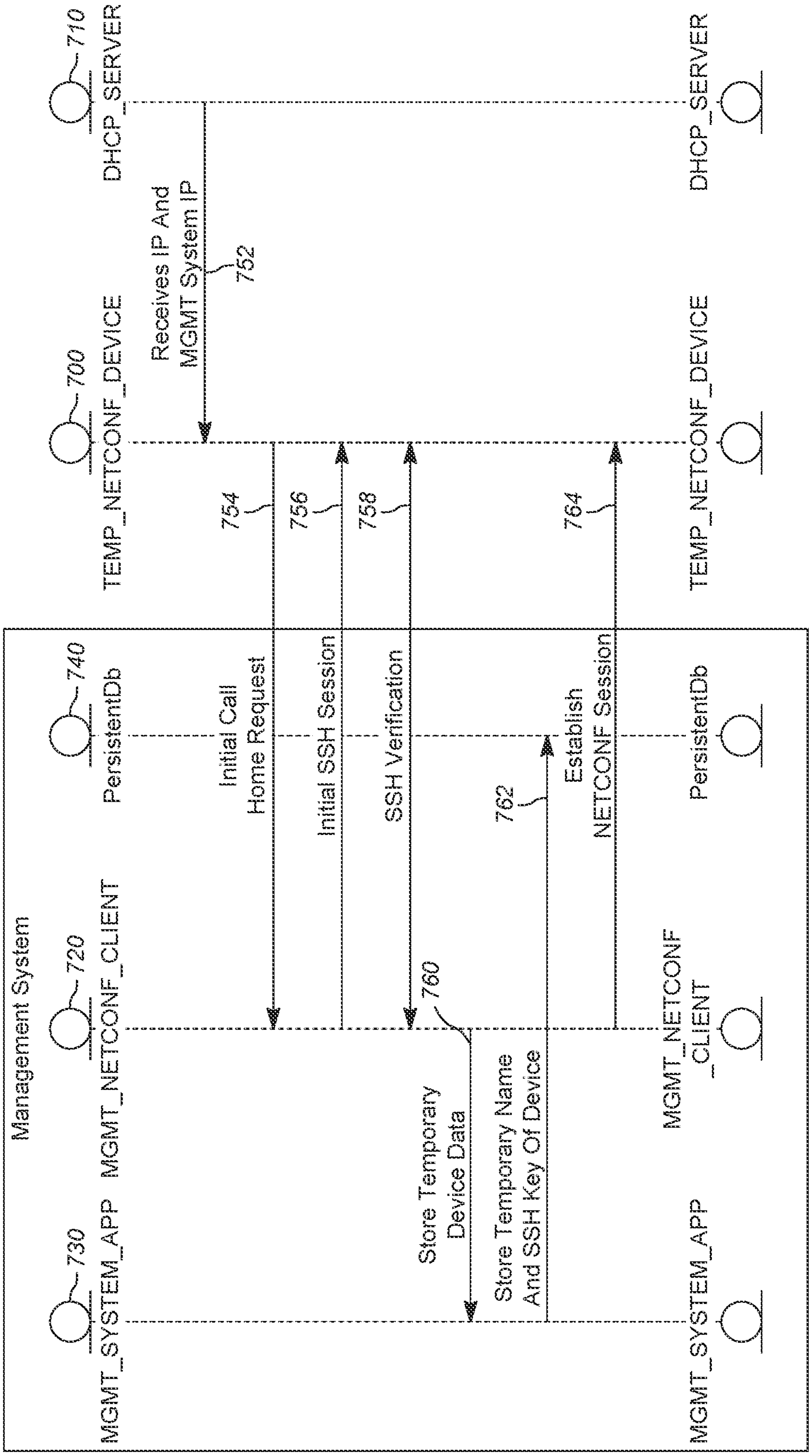
FIG. 48 illustrates an exemplary establishment of a temporary NETCONF connection.
Figure 49:
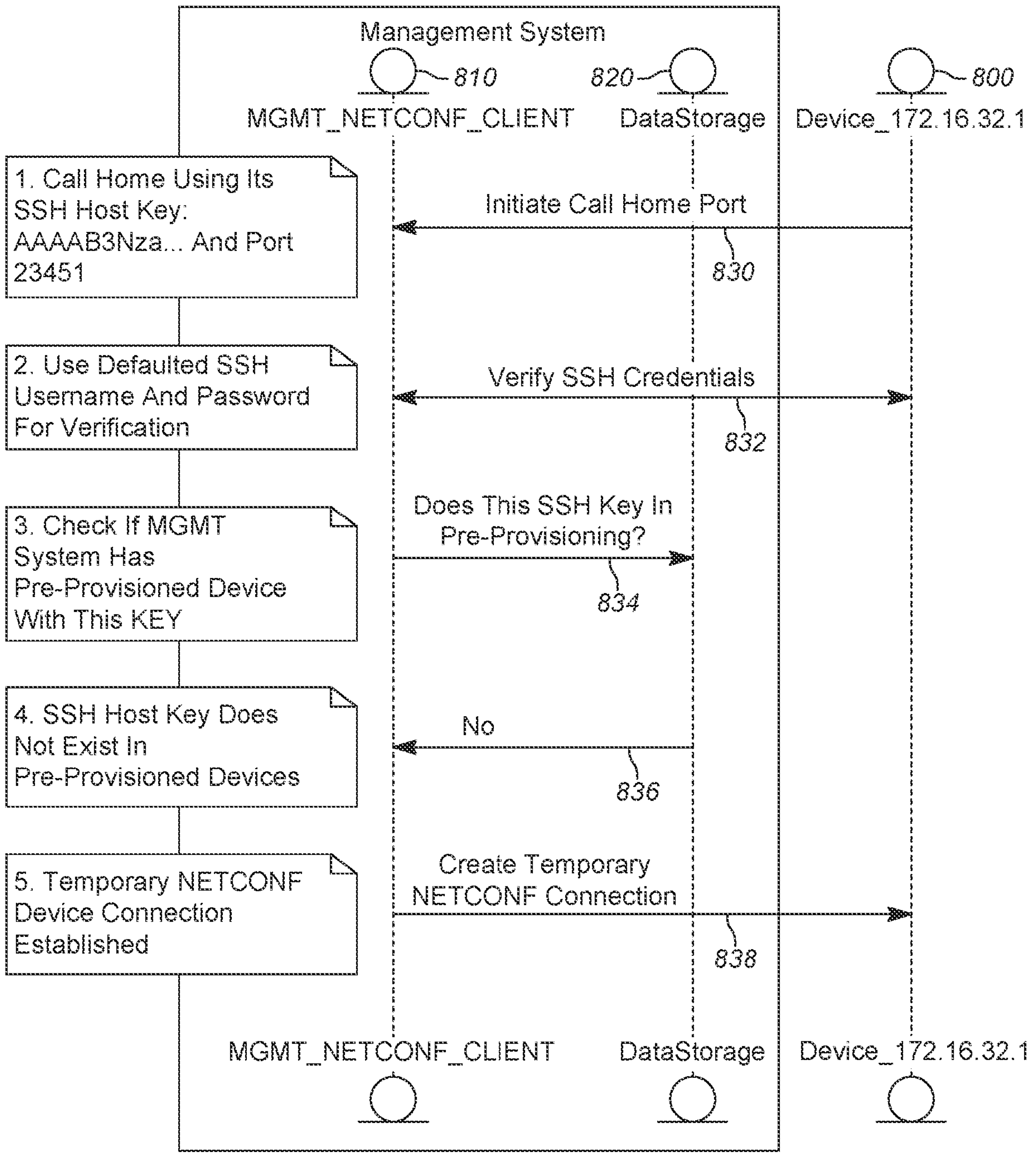
FIG. 49 illustrates an exemplary establishment of a temporary NETCONF connection.
Figure 50:
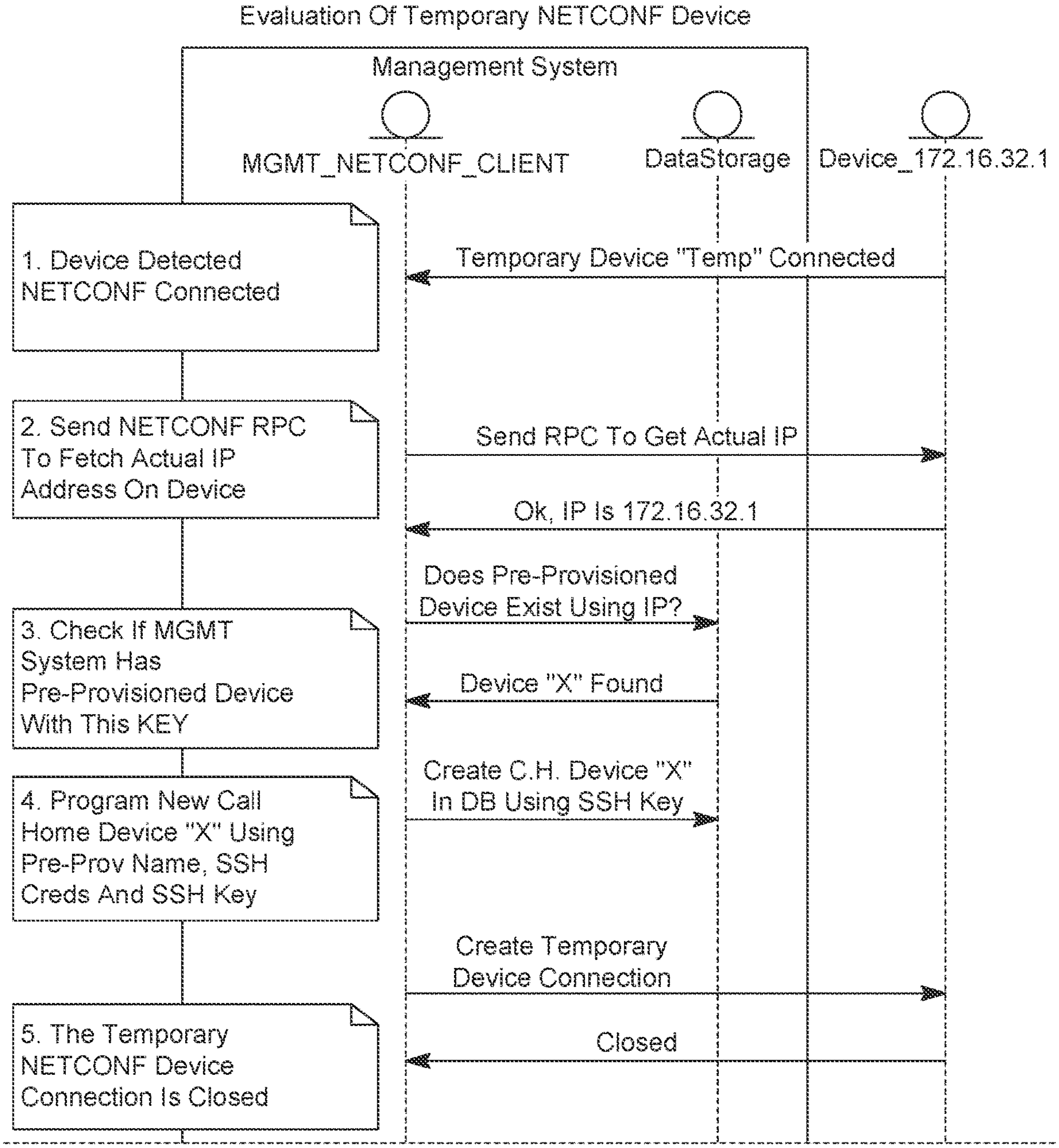
FIG. 50 illustrates an exemplary evaluation of temporary NETCONF device.
Figure 50:
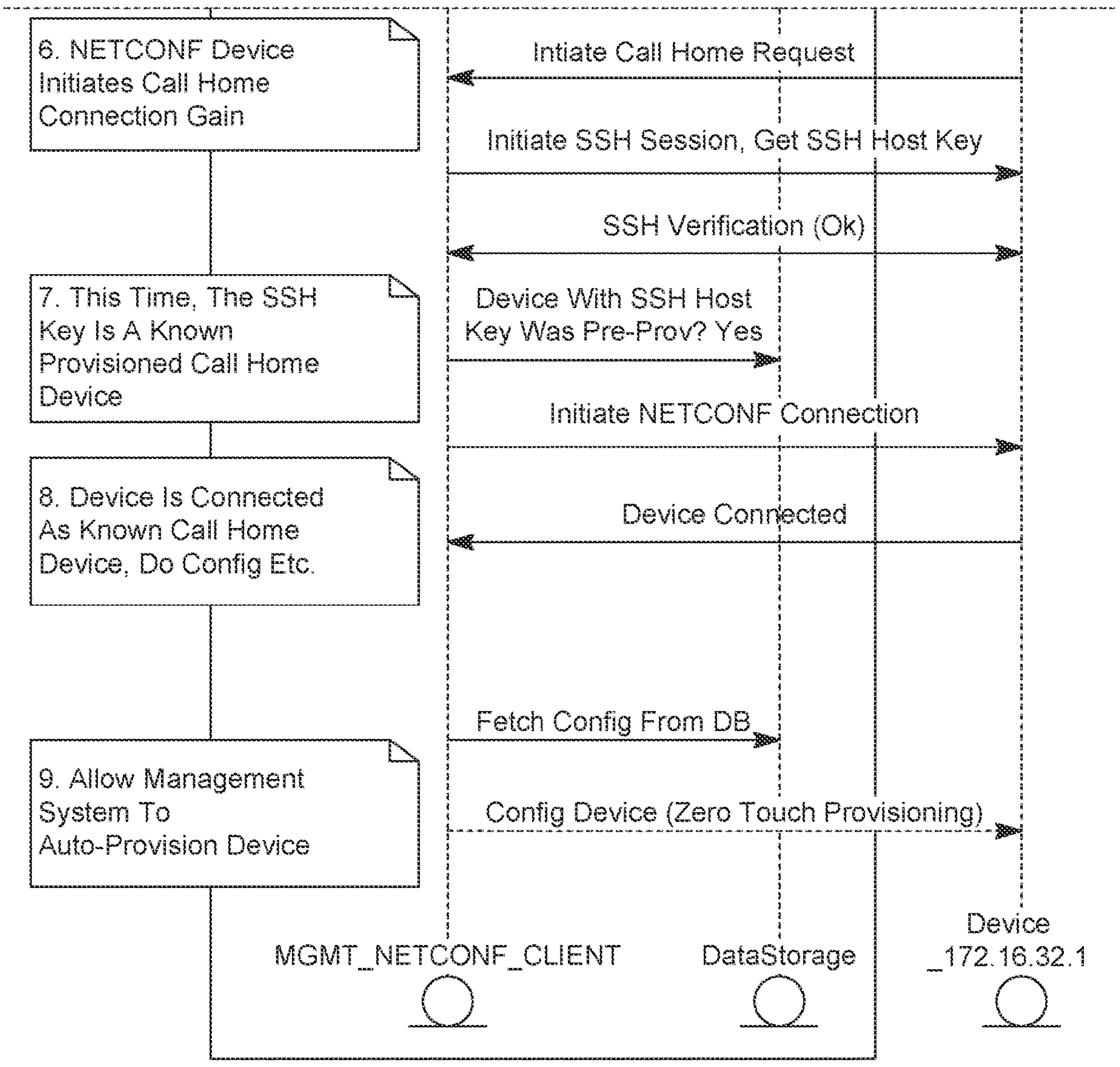
Figure 51:
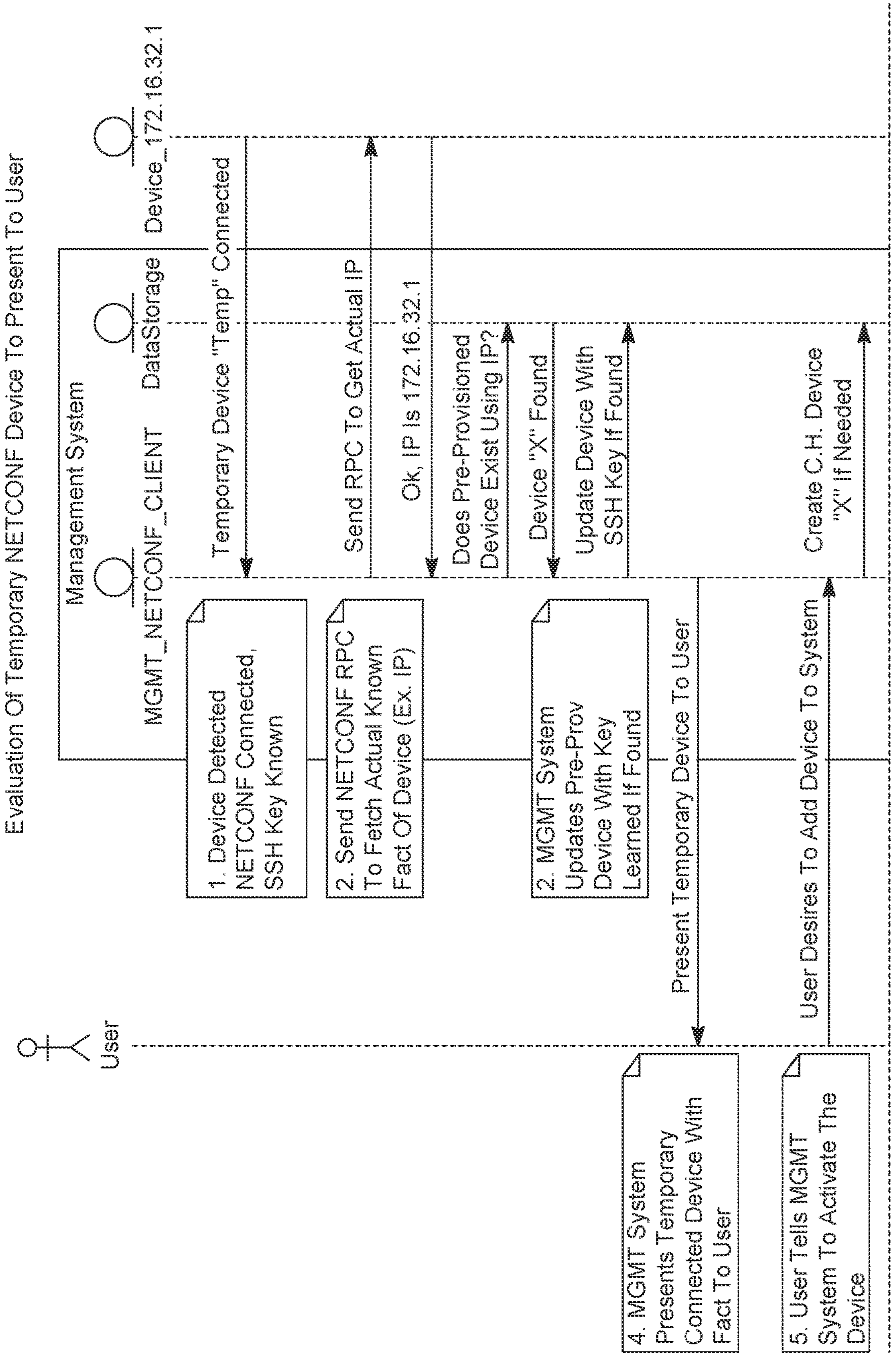
FIG. 51 illustrates an exemplary evaluation of temporary NETCONF device.
Figure 51:
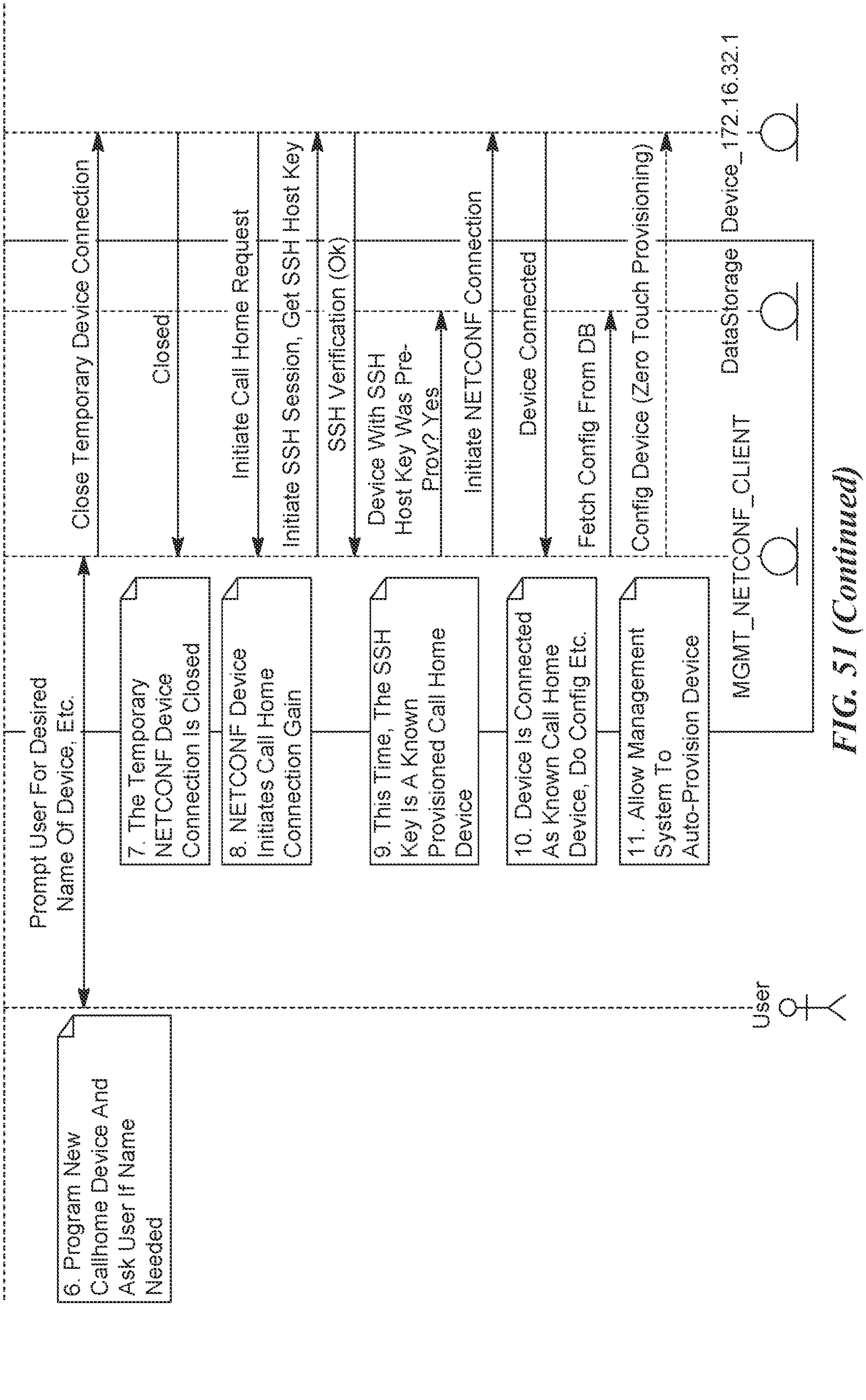

Referring to FIG. 45, the monitoring system may monitor the latency of HARQ messages. In one embodiment, the monitoring of the HARQ message latency may be based upon whether they are transmitted fast enough, or rather they linger for too long of a time in a respective queue of the remote-OLT/OLT/ONT, and they are dropped from the queue without transmission.

In another embodiment, the monitoring of the HARQ message latency may be based upon tagging or otherwise identifying a particular HARQ message. The HARQ message is received by the radio unit and the time is determined. The duration that the HARQ message is maintained in the buffer at the radio unit at which it is transmitted from the radio unit is measured, so that a determination of the effectiveness of the buffering for time sensitive messages for the radio unit may be estimated. The time that the HARQ message is received at the ONT is measured, so that the time from the radio unit to the ONT may be determined. The duration that the HARQ message is maintained in the ONT buffer at which it is transmitted from the ONT is measured, so that a determination of the effectiveness of the buffering for time sensitive messages for the ONT may be estimated. The time that the HARQ message is received at the remote-OLT/OLT is measured, so that the time the HARQ message is transmitted through the optical fiber may be determined. The time that the HARQ message is maintained in the buffer at which it is transmitted from the remote-OLT/OLT is measured, so that a determination of the effectiveness of the buffering for the time sensitive messages may be estimated. The time that the HARQ message is received by the distributed unit is determined so that the travel time to the distributed unit may be determined. Also, the time until the corresponding return message to the HARQ message from the distributed unit is determined so that the processing time of the distributed unit may be determined. In a similar manner, the transmission and reception times of the remote-OLT/OLT, optical fiber, and ONT are determined. With this granular information, the operator may use the monitoring system to determine a likely source of HARQ based errors.

In some cases, it is desirable to know the processing characteristics of the combination of the passive optical network and the cellular based network under different loading characteristics. With the radio units providing temporally distinct substantially unidirectional data traffic, the ONT may determine the start of receiving a stream of data from the antenna, and in response inject a "test" HARQ message into the data stream. The monitoring system may also determine the various transmission times, and the total round-trip time for the "start" HARQ message to traverse the network and return to the ONT. With the radio units providing temporally distinct substantially unidirectional data traffic, the ONT may estimate a mid-point of receiving a stream of data from the antenna, and in response inject a "test" HARQ message into the data stream. The monitoring system may also determine the various transmission times, and the total round-trip time for the "mid-stream" HARQ message to traverse the network and return to the ONT. With the radio units providing temporally distinct substantially unidirectional data traffic, the ONT may determine the end of receiving a stream of data from the antenna, and in response inject a "test" HARQ message into the data stream. The monitoring system may also determine the various transmission times, and the total round-trip time for the "end" HARQ message to traverse the network and return to the ONT. With this information the monitoring system may determine characteristics regarding the initial portion, an intermediate portion, and a later portion of the data stream to determine its effect on the timeliness of the HARQ messaging.

Alarm conditions may be provided to the operator through the monitoring system based upon the data.

To configure network based devices, including remote OLTs, a Network Configuration Protocol (NETCONF) is often employed. NETCONF is a network management protocol described in RFC 4741 (i.e., Enns, R., Ed., "NETCONF Configuration Protocol", RFC 4741, DOI 10.17487/RFC4741, December 2006, https://www.rfc-editor.org/info/rfc4741), incorporated by reference herein in its entirety) and further revised in RFC 6241 (i.e., Enns, R., Ed., Bjorklund, M., Ed., Schoenwaelder, J., Ed., and A. Bierman, Ed., "Network Configuration Protocol (NETCONF)", RFC 6241, DOI 10.17487/RFC6241, June 2011, https://www.rfc-editor.org/info/rfc6241, incorporated by reference herein in its entirety). NETCONF provides mechanisms to install, manipulate, and delete configuration related data of network devices. The NETCONF protocol uses XML based data encoding for the messages on top of a remote procedure call, where the protocol messages are preferably exchanged on top of a secure transport protocol.

Referring to FIG. 5 the NETCONF protocol may be conceptually partitioned into four layers. A content layer includes configuration data and notification data. An operations layer defines a set of base protocol operations to retrieve and edit the configuration data. A messages layer provides a mechanism for encoding remote procedure calls and notifications. A secure transport layer provides a secure and reliable transport of messages between a client and a server.

For a normal NETCONF connection, the NETCONF client first establishes a transmission control protocol (TCP) connection to the NETCONF server and then starts up a secure shell (SSH) (or Transport Layer Security (TLS)) followed by NETCONF based process over this TCP connection. However, for certain use cases such as the presence of firewalls or NAT, it is useful to have Call Home functionality where the connection process is reversed and the NETCONF server initiates the connection to the NETCONF client. Using NETCONF Call Home, the NETCONF server establishes the TCP connection to the NETCONF client (reverse of the normal process) and then the NETCONF client starts up SSH and NETCONF as normal. Therefore, to use NETCONF Call Home, both the NETCONF server and the NETCONF client provide support for it.

A Network Configuration Protocol (NETCONF) Call Home describes a process which enables a NETCONF or RESTCONF server to initiate a secure connection to a NETCONF or RESTCONF client, respectively. NETCONF Call Home is a network management protocol described in RFC 8701 (i.e., K. Watsen, "NETCONF Call Home and RESTCONF Call Home", February 2017, https://www.rfc-editor.org/rfc/rfc8071.html), incorporated by reference herein in its entirety). In general, as described in RFC 8701, a device is added to a network and typically obtains an Internet Protocol address using a Dynamic Host Configuration Protocol (DHCP) from a Dynamic Host Configuration Protocol (DHCP) server, and obtains a "Call Home" Internet Protocol (IP) address from the DHCP server. The DHCP protocol is desired in RFC 1541 (Droms, R., "Dynamic Host Configuration Protocol", RFC 1541, DOI 10.17487/RFC1541, October 1993, https://www.rfc-editor.org/info/rfc1541, incorporated by reference herein in its entirety).

Referring to FIG. 6, an exemplary NETCONF call home process is illustrated. A NETCONF device 600 boots and receives an IP address 630 from a DHCP server 610. The IP address 630 also includes management system connection information, such as its IP address included in DHCP options fields. The NETCONF device 600 establishes a TCP connection 632 with a management system 620 (NETCONF client). The management system 620 initiates a SSH session 634 with the NETCONF device 600. The NETCONF device 600 and the management system 620 perform a SSH verification 636 based upon the user name, password, and SSH host key that is provided by the NETCONF device 600 and verified by the management system 620 against a corresponding SSH host key. The management system 620 establishes a NETCONF session 638 with the NETCONF device 600. The SSH host key is a cryptographic key which is unique to the device. In other embodiments, the network based addresses may be obtained using other techniques, than a DHCP server. In other embodiments, the verification of the NETCONF device may be based upon the SSH host key, and in addition if desired, the user name and/or password and/or any other criteria.

By way of example, the management system may include a database of pre-provisioned devices.

| | |
|---|---|
| Device A | Expected SSH host key "X" |
| Device B | Expected SSH host key "Y" |
| Device C | Expected SSH host key "Z" |

In the case of a remote-OLT, or other network based device (i.e., NETCONF server/NETCONF device), it includes a SSH host key that is included with the device, typically programmed into the electronics of the device during the manufacturing process. When the NETCONF server initiates an interconnection to the NETCONF client (e.g., management system), it provides a user name, a password, and the SSH host key. The management system uses the user name, password, and/or SSH host key to validate the network based device. However, for the NETCONF device to be accepted by the management system, the management system needs to accept the host key that is provided. The SSH host key, which is used to verify that a proper device is being accepted by the management system, the management system is typically also previously provided with the SSH host key so that the received SSH host key from the NETCONF device may be verified as to whether it should be accepted. However, for remotely located devices, such as a remote-OLT, it is problematic for the operators of the network to organize and manage all of the potential SSH host keys, it is further difficult for the operator to manually obtain the SSH host keys from NETCONF devices, and it is further difficult for the operator to manually provide all of the potential SSH host keys to the management system. Also, it is desirable that the SSH host keys are not displayed on the packaging of the device, like a media access control (MAC) number, for security considerations.

To overcome the burden of pre-provisioning the management system with all the SHH host keys that may someday be presented for validation, it is desirable to permit the management system to learn the SSH host key by permitting a "temporary" NETCONF connection which bypasses the SSH host key verification process. In this case, the management system does not previously have the SSH host key to verify the SSH host key being provided. The management system may pass the temporary devices default user name and password for verification. The management system pre-provisions devices ahead of time by using a 'known fact' about such devices. For example, such known fact, may include a deployed IP address or a range of IP addresses to which the device is likely provided. Especially in the case of a passive optical network, the management system may be aware of a range of IP addresses that will be available to such remote-OLTs. The establishment of a temporary connection permits a NETCONF "GET" of data from the NETCONF device that is used to verify the known fact. After verification of the known fact, which may be automatic or confirmed by an operator, the management system may accept the SSH host key. The inclusion of a temporary NETCONF connection requires a modification to the NETCONF call home process, which also tends to break the security included with the NETCONF call home process.

Referring to FIG. 7, an exemplary modified NETCONF call home process is illustrated. A NETCONF device 700 boots and receives an IP address and management system IP address 752 from a DHCP server 710. The management system IP address 752 includes management system connection information. The NETCONF device 700 initiates a call home request 754 based upon the management system connection information to establish a TCP connection with a management system NETCONF client 720. A SSH host key that is provided by the NETCONF device 700 during the call home request if not recognized by NETCONF client 720, which as a result, initiates a temporary SSH session 756. The NETCONF client 720 and the NETCONF device 700 perform a SSH verification 758. The SSH verification may include obtaining or otherwise identifying known facts of the NETCONF device 700. The known facts may include, for example, the IP address of the NETCONF device, a MAC address of the NETCONF device, or other identifying information. The known facts, automatically or based upon operator confirmation, may be used to validate whether the NETCONF device should be authenticated in the future based upon its SSH host key. The NETCONF client 730, upon validation of the NETCONF device, stores temporary device data 760 of the NETCONF device 700. A management system application 730 may store data 762 related to the NETCONF device 700, such as a temporary name and its SSH host key. The stored data may be in a cache and/or a persistent storage 740. With the verification of the NETCONF device 700 in some manner apart from the SSH host key, the management client 720 establishes a NETCONF session 764 with the NETCONF device 700 based upon the SSH host key. By way of example, the current session between the NETCONF device 700 and the management client 720 may be converted into a typical connection, together with all the management capabilities permitted by the NETCONF device 700 and/or the management client 720. By way of example, the current session between the NETCONF device 700 and the management client 720 may be terminated, and the NETCONF device 700 and the management client 720 may initiate a new connection that is based upon the SSH host key that includes all the management capabilities permitted by the NETCONF device 700 and/or the management client 720.

By way of example, a known fact may include, an IP address of a NETCONF interface. This is expected to be assigned to the device by the DHCP server or in some other manner, which is known by the management system.

By way of example, a known fact may include, an IP address range of a NETCONF interface. A range of IP addresses that the NETCONF interface may be assigned by the DHCP server or in some other manner, which is known by the management system.

By way of example, a known fact may include, the MAC address of the NETCONF interface. This known fact may be obtained when the call home device tries to connect to the management. If the management system is unable to know the MAC address of the device connecting to it, it should not be used as the known fact.

By way of example, a known fact may include, a known parameter that is assigned and persistent in the software and/or hardware of the device. For example, such a parameter may be able in a field replaceable unit code on the device, such as one that may be scanned during installation and stored in a database which is accessible by the management system during pre-provisioning. This parameter should be obtainable using a NETCONF RPC.

Referring to FIG. 8, another embodiment illustrates a portion of the modified NETCONF call home process. The NETCONF device 800 initiates a call home 830 to the management client 810. The NETCONF device 800 and the management client 810 verify the SSH credentials 832. The management client 810 checks if the provided SSH host key has been pre-provisioned 834 by checking a data storage 820. If the management system 810 determines that the SSH host key is not pre-provisioned 836 for the NETCONF device 800, then the management system 810 establishes a temporary NETCONF device connection 838.

After the temporary NETCONF connection is established, the management system may consider the device "connected". As a result, NETCONF RPCs may be used to obtain additional information. For example, the management system may use the temporary connection to obtain or otherwise determine a known fact regarding the NETCONF device. The temporary NETCONF connection provides fewer capabilities than the non-temporary NETCONF connection, based upon the SSH host key being verified.

Referring to FIG. 9, the management system may evaluate the device to determine if it should be automatically provisioned. The management system may send a RPC request to the NETCONF device to obtain the actual provisioned IP address of the NETCONF interface. Using this IP address, the management system may cross reference any pre-provisioned devices it is aware of, or otherwise an acceptable pre-provisioned IP address range for such NETCONF devices.

As illustrated, the temporary NETCONF device is connected to the management system, as illustrated in FIG. 8. The management system sends a RPC NETCONF command (XML) to fetch the actual provisioned IP address of the NETCONF interface on the device. If some other known fact is checked, the management system may use a NETCONF RPC to fetch that information. The management system checks its data store to find a pre-provisioned device that contains the IP address found using the NETCONF RPC. If another attribute is used for the known fact, that may be checked instead. The management system finds a pre-provisioned device matching the known fact. If it does not find a device, the temporary device may be left connected, closed, or put on a list to never allow (implementation dependent). The NETCONF client inside the management system may create a new entry to map the name of the pre-provisioned device to the SSH key for this temporary device. The SSH host key is known because it was saved against the generated name for this temporary NETCONF connected device in previous steps. It is typical for the NETCONF client to create such an entry such that when the device calls home again the management system can quickly decide to allow the device in the system. The entry uses the name of the pre-provisioned device in the management system to make the SSH host key for easy look up. The temporary NETCONF connection is no longer required and may be closed out. After a short time, the NETCONF device will attempt to call home again to the management system. This attempt at call home results in a different outcome. The NETCONF client (management system) expects to see the SSH host key. The device is allowed as a normal call home device because the SSH host key is known to the system, and the SSH verification passes as well. It is noted that the SSH verification parameters may be different that this point in the process, if desired. During pre-provisioning, a different set of username and password may be used. The management system creates the NETCONF connection to the remote SSH NETCONF call home device. It is a seen as a normal connected device to the management system. The management system can then proceed with zero-touch provisioning.

Referring to FIG. 10, in another embodiment the management system may present to the user the temporary connected NETCONF device. Each temporary connected device may be shown in the management system with its temporary name, learned SSH host key, and learned "fact" such as its real NETCONF IP address. The operator can selectively decide to add the device to the system.

As illustrated, the temporary NETCONF device is connected to the management system, as illustrated in FIG. 8. The management system sends an RPC NETCONF command (XML) to fetch the actual provisioned IP address of the NETCONF interface on the device. If some other fact was to be checked, the management system would use a proper NETCONF RPC to fetch that information. The management system checks its data store to find a pre-provisioned device that contains the IP address found using the NETCONF RPC. In this alternate procedure, there may not be a match in the management system. If another attribute was used for the device fact, that may be checked instead. If a match is found, the pre-provisioned data entry for the device is updated with the temporary device's SSH host key. The management system can display all temporary devices to the user on a webpage, GUI, or command line interface. Each temporary device shown would contain its temporary name and its known fact (IP address for example). If the device was pre-provisioned already, the management system would show the pre-provisioned device name instead of the temporary one. Any pre-provisioned information would be accessible by the user as well. The user can decide if the device should be allowed into the system normally. The user decides to add the device as an official call home NETCONF device. The management system creates a pre-provisioned device entry in its data storage if there is not one already there. If the NETCONF device is not already pre-provisioned the management system may guide or prompt the user through a process. The user would need to input the official name of the device as known by the management system. If the device is already pre-provisioned, there may be minimal action by the user. The temporary NETCONF connection is no longer required. It is closed out. After a short time, the NETCONF device will attempt to call home again to the management system. The management system (NETCONF client) sees the incoming connection from the NETCONF device. The device is allowed as a normal call home device because the SSH host key is known to the system, and the SSH verification passes as well. Note that the SSH verification parameters may be different that this point in the process. It is possible that during pre-provisioning, a different set of username and password is used. The management system initiates the NETCONF connection to the remote SSH NETCONF call home device. It is a seen as a normal connected device to the management system. The management system can then proceed with zero-touch provisioning.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An access network for a passive optical network comprising:

(a) an optical line terminal includes a north bound interface that is capable of receiving and sending data from and to a server, respectively;

(b) said optical line terminal includes a port that is capable of receiving and sending optical data from and to a set of optical network terminals, respectively, through an optical fiber;

(c) said optical line terminal including a physical optical line terminal (pOLT) included on said optical line terminal that is said capable of receiving and sending data from and to said server, respectively;

(d) said optical line terminal including a virtual optical network unit management and control interface adapter (vOMCI Adapter) that is included on said optical line terminal that receives messages from said physical optical line terminal (pOLT) that are not TR-451 compliant Yang based communications;

(e) a virtual optical network unit management and control interface (vOMCI) that receives TR-451 compliant Yang based communications on a first interface from said virtual optical network unit management and control interface adapter (vOMCI Adapter) in response to said virtual optical network unit management and control interface adapter (vOMCI Adapter) said receives messages from said physical optical line terminal (pOLT) that are said not TR-451 complaint Yang based communications;

(f) said virtual optical network unit management and control interface (vOMCI) provides TR-451 compliant OMCI transport protocol-based communications from a second interface to said physical optical line terminal (pOLT);

(g) said physical optical line terminal (pOLT) receives TR-385 complaint Yang based communications from a controller on a third interface that in response are provided as said receives messages from said physical optical line terminal (pOLT) that are said not TR-451 complaint Yang based communications, where said TR-385 complaint Yang based communications are not TR-451 complaint Yang based communications, wherein said controller does not include a virtual optical line terminal (vOLT) used for providing any messages to said optical line terminal.

2. The access network of claim 1 wherein said messages received by said virtual optical network unit management and control interface adapter include a callback and/or an application program interface.

3. The access network of claim 1 wherein said first interface is a north bound interface of said virtual optical network unit management and control interface.

4. The access network of claim 1 wherein said second interface is a south bound interface of said virtual optical network unit management and control interface.

5. The access network of claim 1 wherein said third interface is a north bound interface of said optical line terminal.

* * * * *